United States Patent
Ha et al.

(10) Patent No.: US 7,447,968 B2
(45) Date of Patent: Nov. 4, 2008

(54) APPARATUS AND METHOD FOR SUPPORTING AUTOMATIC REPEAT REQUEST IN A HIGH-SPEED WIRELESS PACKET DATA COMMUNICATION SYSTEM

(75) Inventors: Sang-Hyuck Ha, Suwon-shi (KR); Min-Goo Kim, Suwon-shi (KR); Jin-Woo Heo, Songnam-shi (KR); Young-Kwon Cho, Suwon-shi (KR); Sang-Min Bae, Kyonggi-do (KR)

(73) Assignee: Samsung Electronics, Co., Ltd., Suwon-Si (KR)

(*) Notice: Subject to any disclaimer, the term of this patent is extended or adjusted under 35 U.S.C. 154(b) by 1291 days.

(21) Appl. No.: 10/421,818

(22) Filed: Apr. 24, 2003

(65) Prior Publication Data

US 2003/0202500 A1 Oct. 30, 2003

(30) Foreign Application Priority Data

Apr. 24, 2002 (KR) ............... 10-2002-0022392
Feb. 10, 2003 (KR) ............... 10-2003-0008263

(51) Int. Cl.
*G08C 25/02* (2006.01)
*H04L 1/18* (2006.01)

(52) U.S. Cl. ............... 714/748; 714/749; 714/750; 714/751; 370/342; 370/335

(58) Field of Classification Search .......... 714/748–751
See application file for complete search history.

(56) References Cited

U.S. PATENT DOCUMENTS

| 5,633,874 | A | 5/1997 | Diachina et al. |
| 5,701,298 | A | 12/1997 | Diachina et al. |
| 5,729,541 | A | 3/1998 | Hamalainen et al. |
| 5,799,012 | A | 8/1998 | Ayerst et al. |
| 6,011,799 | A | 1/2000 | Kerstein et al. |
| 6,335,933 | B1 | 1/2002 | Mallory |
| 6,353,907 | B1 | 3/2002 | Van Nobelen ............ 714/746 |

OTHER PUBLICATIONS

Lucent Technologies: "TSG-RAM#17(00)1382: Asynchronous and Adaptive IR for HSDPA" Nov. 25, 2000; pp. 1-5.
D.W. Krause, "PARQ-A System Supporting Information Networking Over HF Radio Links"; Radio Systems and Techniques, Seventh International Conference (Conf. Publ. No. 441), Jul. 7-10, 1997 pp. 408-412.

(Continued)

*Primary Examiner*—Guy J Lamarre
(74) *Attorney, Agent, or Firm*—Roylance, Abrams, Berdo & Goodman, LLP

(57) ABSTRACT

Disclosed is an apparatus and method for supporting automatic repeat request (ARQ) in a high-speed wireless packet data communication system. A mobile station receives control information including a subpacket identifier (SP_ID) representing the sequence of a subpacket, the size of an encoder packet (EP_SIZE), and a sequence identifier (AI_SN) that is toggled each time a new encoder packet is transmitted, while receiving one of a plurality of subpackets generated by segmenting a bit stream acquired by encoding a transmission encoder packet. The mobile station determines whether it will perform a decoding process caused by initial transmission or a decoding process caused by retransmission on the received subpacket, based on the control information.

18 Claims, 18 Drawing Sheets

OTHER PUBLICATIONS

Krishna R. Narayanan et al., "Physical Layer Design for Packet Data Over IS-136" Vehicular Technology Conference, 1997 IEEE 47th, vol. 2, May 4-7, 1997, pp. 102-1033, vol. 2.

Qian Zhang et al., "Performance of a Type-II Hybrid ARQ Protocol in Slotted DS-SSMA Packet Radio Systems", IEEE Transactions on Communications, vol. 47, No. 2, Feb. 1999, pp. 281-290.

Y. Yuan-Wu, Performance of 64 kbit/s Data Transmission with the ARQ Protocol of the DECT Standard on Fading Channels, Vehicular Technology Conference, 2000, IEEE VTS-Fall VTC 2000, 52nd, vol. 6, Sep. 24-28, 2000, pp. 2561-2567.

Esa Malkamaki et al., "Performance of Hybrid ARQ Techniques for WCDMA High Data Rates", Vehicular Technology Conference, 2001, IEEE VTS 53rd, vol. 4, May 6-9, 2001, pp. 2720-2724.

APPARATUS AND METHOD FOR SUPPORTING AUTOMATIC REPEAT REQUEST IN A HIGH-SPEED WIRELESS PACKET DATA COMMUNICATION SYSTEM

PRIORITY

This application claims priority under 35 U.S.C. § 119 to an application entitled "Apparatus and Method for Supporting Automatic Repeat Request in a High-Speed Wireless Packet Data Communication System" filed in the Korean Intellectual Property Office on Apr. 24, 2002 and assigned Serial No. 2002-22392, and an application entitled "Apparatus and Method for Supporting Automatic Repeat Request in a High-Speed Wireless Packet Data Communication System" filed in the Korean Intellectual Property Office on Feb. 10, 2003 and assigned Serial No. 2003-8263, the contents of both of which are incorporated herein by reference.

BACKGROUND OF THE INVENTION

1. Field of the Invention

The present invention relates generally to a high-speed wireless packet data communication system, and in particular, to an apparatus and method for supporting automatic repeat request.

2. Description of the Related Art

Wireless communication systems have been developed to enable users to continue smooth communication while travelling. The development of a wireless communication technology has given impetus to research in technology for transmitting large quantities of data to users.

Wideband Code Division Multiple Access (W-CDMA) wireless communication system a typical CDMA2000 1× system, were designed to support only voice service and relatively low-speed packet data service. However, with the development of communication technology and at the request of users, research has been carried out in wireless communication systems supporting a high-speed packet data service. Among others, one example is an IS-2000 1×EV-DV (Evolution in Data and Voice) system, which is the new CDMA standard developed by 3GPP2 (3rd Generation Partnership Project 2). This is considered as the preferred system for supporting not only a voice service, but also high-speed packet data service. In order to realize a system capable of supporting both high-speed packet data service as well as voice service, it is necessary to design both a base station (BS) and mobile station (MS) capable of handling high-speed wireless packet data.

In a wireless channel environment characterized in that variation in channel conditions are considerable and traffic channels for different types of services coexist, automatic repeat request (hereinafter referred to as "ARQ") is used to increase transmission efficiency, or transmission throughput, for high-speed data transmission. According to ARQ protocols, a receiver requests retransmission when an error has occurred in received data, and a transmitter retransmits the data in response to the request so that the receiver can obtain reception quality over a predetermined level.

In a typical wireless communication system, ARQ could not be considered for a voice call service, since the voice call service is requested real-time processing. Thus, ARQ was restrictively supported in an upper layer for a circuit-based data service only. As a proposal for increasing transmission throughput, a proposal has been made for supporting ARQ in a physical layer rather than in the upper layer, and this proposal is discussed as a part of the standard for a high-speed wireless packet data communication system (e.g., 1×EV-DV system) that is currently being developed.

In a currently discussed system, a receiver corrects an error existing in received data within the limit of its error correction capability, but sends a retransmission request message to a transmitter when it cannot correct the error: this technology is called hybrid ARQ (hereinafter referred to as "H-ARQ"). Since commercialization of a high-speed data transmission service will soon be available, analysis and research has been conducted on a technology for efficiently applying, in an actual system, new H-ARQ where a variable coding rate error correction code is used rather than existing hybrid H-ARQ where a fixed coding rate error correction code is used. Furthermore, at least one study has been made of a method for applying, to the system, high level modulation e.g., 8-ary phase shift keying (8PSK), 16-ary quadrature amplitude modulation (16QAM), binary phase shift keying (BPSK) and quadrature phase shift keying (QPSK), for a high-speed transmission channel structure.

The new CDMA standard, the IS-2000 1×EV-DV system adopts a coding scheme using quasi-complementary turbo codes (QCTC). The QCTC supports the variable coding rate for H-ARQ on high-speed data, and secures improvement of soft-combining performance by H-ARQ. In the 1×EV-DV system, transmission and reception of packet data is performed by H-ARQ or fast H-ARQ of a physical layer.

When implementing H-ARQ, many factors should be considered in terms of system complexity, such as buffer size and signaling load of a transmitter and a receiver, in addition to the transmission throughput. Accordingly, there have been demands for a control algorithm for more efficiently managing H-ARQ for improving system efficiency and service quality in a high-speed wireless packet data communication system.

SUMMARY OF THE INVENTION

It is, therefore, an object of the present invention to provide an apparatus and method for controlling an H-ARQ protocol in a high-speed wireless packet data communication system.

It is another object of the present invention to provide an apparatus and method for transmitting a response to a packet received according to an H-ARQ protocol in a high-speed wireless packet data communication system.

It is a further object of the present invention to provide an apparatus and method for separately handling an initially transmitted packet and a retransmitted packet, both received according to an H-ARQ protocol, in a high-speed wireless packet data communication system.

In accordance with one aspect of the present invention, there is provided an automatic repeat request (ARQ) method for generating an encoder packet by receiving control information including a subpacket identifier (SP_ID) representing sequence of a subpacket, a size (EP_SIZE) of an encoder packet, and a sequence identifier (AI_SN) that is toggled each time a new encoder packet is transmitted, while receiving one of a plurality of subpackets generated by segmenting a bit stream acquired by encoding a transmission encoder packet, in a wireless packet data communication system. The ARQ method comprises generating the encoder packet by performing a decoding process caused by initial transmission on the received subpacket, if the AI_SN and the EP_SIZE are both not identical to previously received AI_SN and EP_SIZE; determining whether the SP_ID is set to a value representing initial transmission, if the AI_SN and the EP_SIZE are both identical to previously received AI_SN and EP_SIZE and an acknowledge signal (ACK) is transmitted in response to a previously received subpacket; generating the encoder packet by performing a decoding process caused by initial transmission or retransmission on the received subpacket according to the SP_ID; and generating the encoder packet by performing the decoding process caused by retransmission on the received subpacket, if the AI_SN and the EP_SIZE are both identical to previously received AI_SN and EP_SIZE and ACK is not transmitted in response to a previously received subpacket.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
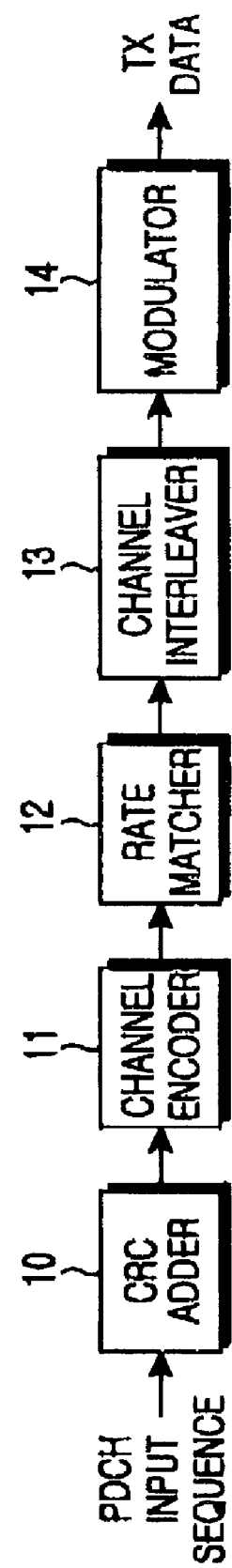
FIG. 1 illustrates a schematic structure of an F-PDCH transmitter for a packet data service.

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

A description will now be made of major channels necessary for a high-speed packet data service according to the present invention. The term "forward channel" as used herein refers to a channel configured in a direction of a base station to a mobile station, and the term "reverse channel" refers to a channel configured in a direction of a mobile station to a base station. In most cases, large quantities of packet data are transmitted from a base station to a mobile station, so the present invention will be described with reference to forward data transmission. Therefore, in the following description, it should be understood that a transmitter refers to a base station and a receiver refers to a mobile station. Of course, the present invention can be applied to all kinds of systems that transmit and receive data wirelessly, without being limited to data transmission from a base station to a mobile station.

Forward channels for a packet data service are classified into a common channel, a control channel, and a traffic channel. In the following description, a prefix "F-" of a particular channel means a forward link configured in a direction of a base station to a mobile station, while a prefix "R-" of a particular channel means a reverse link configured in a direction of a mobile station to a base station.

The common channel represents a pilot channel (PICH), and provides reference amplitude and phase variation for synchronous demodulation at a mobile station. The traffic channel includes a packet data channel (PDCH) for actually transmitting packet data, and the control channel includes a forward packet data control channel (PDCCH) for transmitting control information related to reception of the packet data channel.

The control information includes the following types of information: medium access control identifier (MAC_ID) representing a destination mobile station to which a transmission packet is forwarded; a subpacket identifier (SP_ID) representing a retransmission number of a transmission packet; an ARQ identification sequence number (AI_SN) which is toggled at each transmission of a new packet, in order to indicate whether a transmission packet is an even-numbered packet or an odd-numbered packet; an ARQ identifier (ARQ_ID) representing a channel over which a transmission is transmitted, among ARQ channels transmitted in parallel; an encoder packet size (EP_SIZE) representing a size of a transmission packet; a Walsh space indicator representing Walsh codes to be used for PDCH, and a code division multiplexing (CDM) channel identifier.

A typical scheme for transmitting and receiving a forward packet data channel (F-PDCH) for a packet data service will be described herein below.

FIG. 1 illustrates a schematic structure of an F-PDCH transmitter for a packet data service. Herein, the F-PDCH transmitter refers to a base station.

Referring to FIG. 1, an input sequence of F-PDCH is applied to a cyclic redundancy code (CRC) adder 10, and the CRC adder 10 adds a 16-bit CRC to the input sequence. The CRC-added input sequence is encoded by a channel encoder 11. Herein, the input sequence is called an "encoder packet" (EP), since it is encoded by the channel encoder 11. The channel encoder 11 has a predetermined coding rate R for encoding the encoder packet. If the coding rate R is k/n (n and k are relatively prime), the channel encoder 11 outputs n bits for a k-bit input encoder packet. For example, the coding rate can be 1/2 or 3/4.

The channel encoder 11 employs turbo coding that is estimated to be the most proper coding for reliable high-speed transmission of multimedia data in a next generation mobile communication system. The encoder packet encoded by turbo coding is divided into a systematic part and a parity part. The systematic part means information itself to be transmitted, and the parity part means error correction information added at the transmitter during decoding, to correct an error which occurred during transmission.

For example, if the coding rate R is a symmetric coding rate of 1/2, the channel encoder 11 generates a 2-bit coded output in response to a 1-bit input sequence, and the coded bits include a 1-bit systematic part (information bit) and a 1-bit parity part (parity bit). As another example, if the coding rate R is an asymmetric coding rate of 3/4, the channel encoder 11 generates a 4-bit coded output in response to a 3-bit input sequence, and the coded bits include a 3-bit systematic part and a 1-bit parity part.

In particular, when H-ARQ is used, the coded bit stream corresponding to each input encoder packet is divided into a predetermined number of subpackets each having different increment redundancy (IR) patterns by QCTC symbol selection, and the channel encoder 11 sequentially generates the subpackets one by one, each time a retransmission request for the encoder packet is received. In practice, the transmitter transmits different subpackets at each retransmission. Since all of these subpackets correspond to the same encoder packet, it will be assumed herein that transmission of subpackets corresponding to the same encoder packet is equivalent to retransmission of an encoder packet. The subpackets are identified by SP_ID, and are transmitted from a base station over the F-PDCCH. The SP_ID represents the number of retransmissions on the same encoder packet.

A method of generating the subpackets or sequence in which the subpackets are transmitted, is determined according to a type of H-ARQ applied thereto. Therefore, a plurality of subpackets corresponding to the same encoder packet can be either identical to, or different from one another. For example, a first subpacket, or an initially transmitted subpacket, is comprised of a part or the whole of a systematic part in the coded bit stream, and retransmitted subpackets may include only a parity part, or a part or the whole of a systematic part according to the retransmission number. In the following description, the first subpacket will be referred to as "new subpacket" (or initial transmission subpacket), and its succeeding subpackets will be referred to as "continue subpackets" (retransmission subpackets).

The coded output of the channel encoder 11 undergoes rate matching by a rate matcher 12. Generally, the rate matching is performed by repetition and puncturing on the coded output, when a transport channel is multiplexed or the number of the coded output bits is not identical to the number of bits that can be transmitted over the air.

The rate-matched output undergoes interleaving by an interleaver 13. The interleaving is performed so that a damaged part of the transmission bits should be dispersed instead of being concentrated upon a particular position, thereby preventing a possible burst error which frequently occurs while the transmission bits pass through a fading channel. The prevention of a burst error contributes to minimization of a transmission loss and an increase in a channel coding gain.

The interleaved output is mapped to modulation symbols according to a particular modulation order selected from QPSK, 8PSK, 16QAM and 64QAM by an M-ary modulator 14. The modulation order is selected according to a current condition of the wireless channel.

Though not illustrated in FIG. 1, the transmitter spreads the modulation symbols with a pseudo-random noise (PN) code for identification of a base station and a plurality of Walsh codes for identification of transmission channels, so that a receiver can identify the data transmission channels and the base station that transmits the data.

Figure 2:
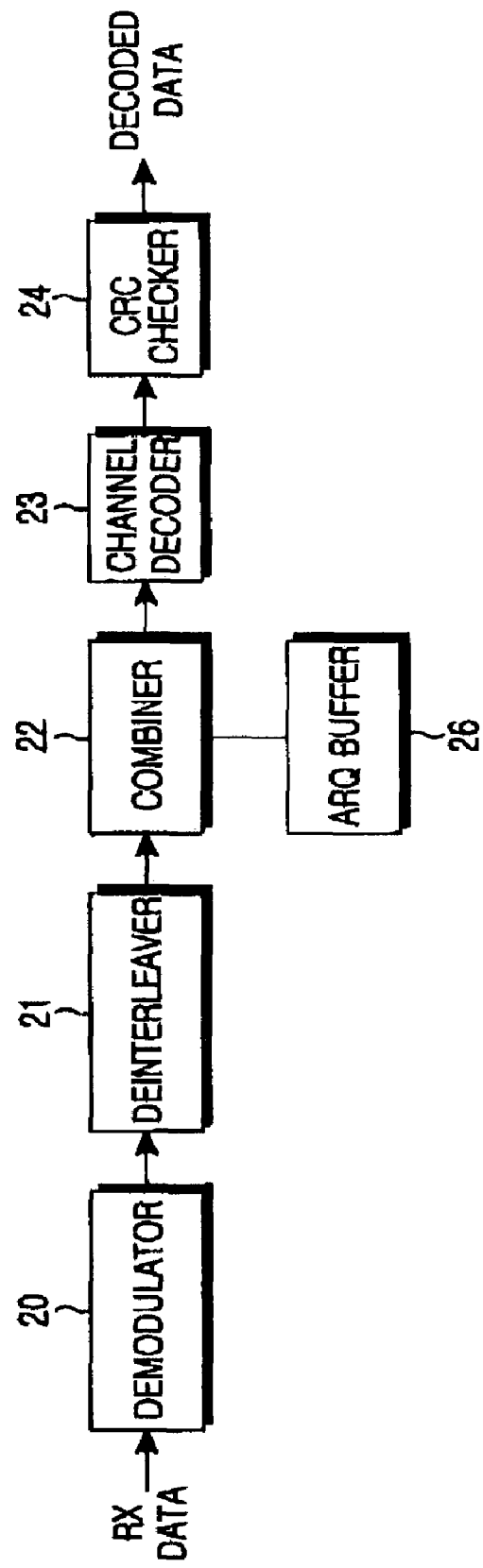
FIG. 2 illustrates a schematic structure of an F-PDCH receiver corresponding to the F-PDCH transmitter of FIG. 1.

FIG. 2 illustrates a schematic structure of an F-PDCH receiver corresponding to the F-PDCH transmitter of FIG. 1. Herein, the F-PDCH receiver refers to a mobile station.

Referring to FIG. 2, received data is despread with a PN code for identification of the transmitting base station and a plurality of Walsh codes for identification of transmission channels by a demodulator 20. The demodulator 20 demodulates the received data by a demodulation scheme corresponding to the modulation scheme used in the modulator 14 of the transmitter. A deinterleaver 21 deinterleaves the demodulated output according to the deinterleaving rule corresponding to the modulating rule used in the interleaver 13 of the transmitter, thereby outputting subpackets. Herein, the "subpacket" refers to each of a plurality of transmission units that are retransmitted for the same encoder packet, and is identified by the SP_ID transmitted from the base station over F-PDCCH. A combiner 22 combines subpackets accumulated in an ARQ buffer 26 for the same encoder packet with the subpackets output from the deinterleaver 21 according to the type of H-ARQ employed. If there is no subpacket accumulated for the same encoder packet, the subpackets output from the interleaver 21 are output without combining. An output of the combiner 22 is provide to a channel decoder 23, and at the same time, stored in the ARQ buffer 26 so that it can be combined with a next received subpacket.

The channel decoder 23 decodes the output of the combiner 22 by a predetermined decoding scheme, thereby restoring a desired encoder packet. The decoding scheme is determined based on the coding scheme performed in the channel encoder 11 of the transmitter.

A CRC checker 24 extracts a CRC from the encoder packet decoded by the channel decoder 23, and determines whether the encoder packet has an error based on the extracted CRC. As a result of the determination, the CRC checker 24 transmits an acknowledge signal (ACK) indicating correct receipt of the encoder packet or a non-acknowledge signal (NAK) indicating retransmission request for the encoder packet, to the base station over a reverse acknowledge channel (R-ACKCH).

When ACK is transmitted, buffer initialization is performed to delete subpackets stored in the ARQ buffer 26 for the corresponding encoder packet. On the contrary, if NAK is transmitted, corresponding subpackets are retained in the ARQ buffer 26.

Format information necessary for reception of the F-PDCH configured in the stated-above manner can be acquired from control information transmitted over F-PDCCH. The control information, as mentioned above, includes MAC_ID, SP_ID, AI_SN, ARQ_ID and EP_SIZE. A mobile station determines whether MAC_ID acquired by demodulating F-PDCCH is identical to its own MAC_ID. If the acquired MAC_ID is identical to its own MAC_ID, the mobile station activates an F-PDCH receiver to receive F-PDCH data, and then transmits a decoding result for the received data to the base station over the R-ACKCH.

The above-described transmitter and receiver correspond to physical layers of a base station and a mobile station, respectively. In a typical wireless communication system with a hierarchical structure, H-ARQ is achieved in an upper layer.

Figure 3:
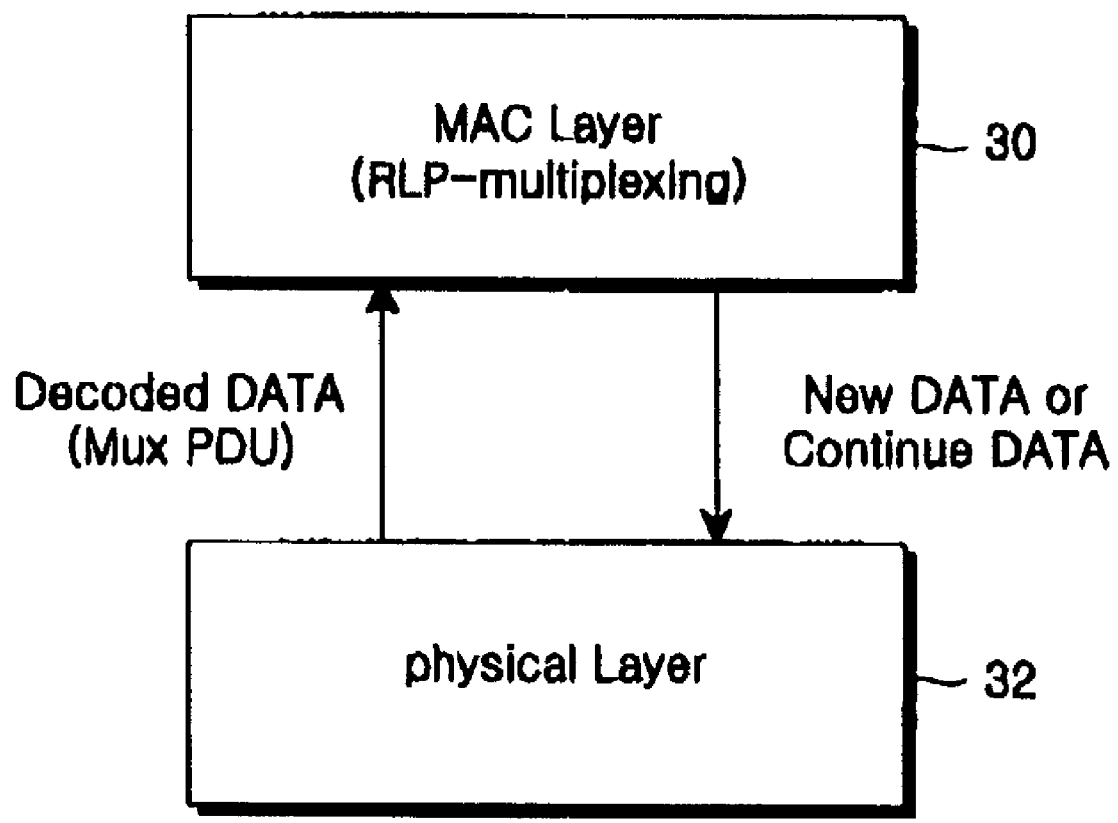
FIG. 3 is a block diagram illustrating a relationship between an upper layer and a physical layer for typical H-ARQ processing.

FIG. 3 is a block diagram illustrating a relationship between an upper layer and a physical layer for typical H-ARQ processing. Referring to FIG. 3, a physical layer 32 decodes a signal transmitted over a wireless channel, and delivers the decoded data to a MAC layer 30, the upper layer, along with its CRC check result in the form of MuxPDU (Multiplexed Protocol Data Unit). The MAC layer 30 determines from the CRC check result whether the decoded data from the physical layer 32 has an error. If no error has occurred, the MAC layer 30 requests transmission of new data. Further, the MAC layer 30 handles the data according to a radio link protocol (RLP). In this manner, the data actually transmitted from the transmitter is determined by the MAC layer 30.

In the case where H-ARQ processing is achieved by the MAC layer 30, the data decoded by the physical layer 32 must be delivered to the MAC layer 30, the upper layer, thus causing a decrease in a processing speed for each retransmission data and an increase in a load of the MAC layer 30 during high-speed data processing.

In addition, when H-ARQ processing is performed in the upper layer, soft combining on the same data cannot be performed. This is because although the physical layer can retain a soft value for each received demodulated symbol, the symbols delivered to the upper layer are converted into a hard value which is a binary value with all 0s or all 1s. Therefore, even though coded symbols for the same encoder packet are repeatedly received by retransmission, the coded symbols cannot be soft-combined. The only available method for symbol combining is to calculate the number of 0s or 1s for the symbols having a binary value, compare the number of 0s with the number of 1s, and select major symbols. This method is called "majority voting". However, majority voting is also scarcely used due to the required amount of calculations. On the contrary, if H-ARQ processing is performed in the physical layer, coded symbols for the same encoder packet can be soft-combined, securing efficient resource utilization.

Figure 4:
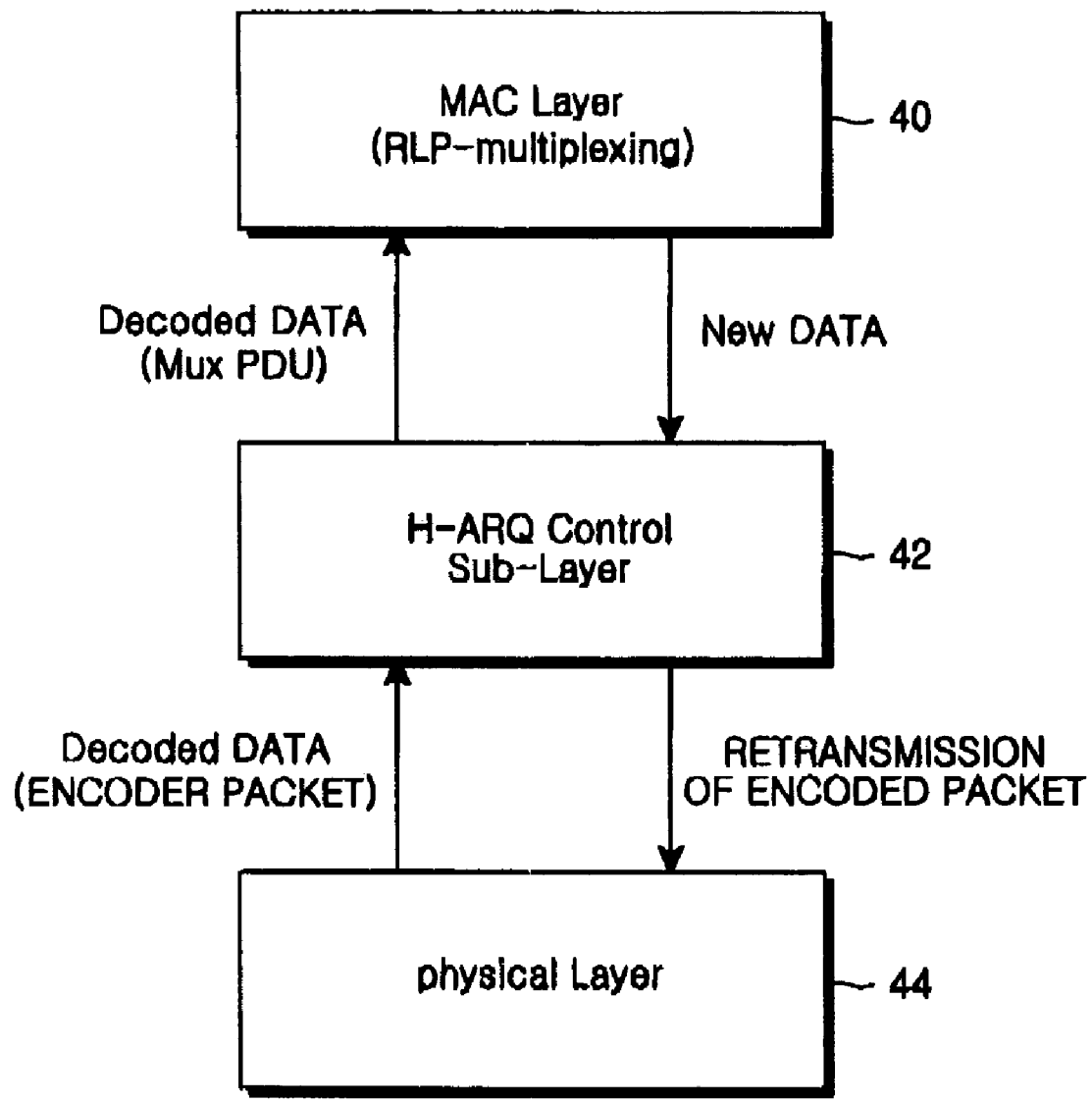
FIG. 4 is a block diagram illustrating an improved relationship between an upper layer and a physical layer for H-ARQ processing.

For these reasons, in accordance with an embodiment of the invention, a structure for handling a part of an H-ARQ operation in a physical layer is proposed as illustrated in FIG. 4.

FIG. 4 is a block diagram illustrating an improved relationship between an upper layer and a physical layer for H-ARQ processing. Referring to FIG. 4, for fast processing and response for H-ARQ, a part of an H-ARQ operation that was conventionally performed in a MAC layer 40 is performed in a physical layer 44 or a sublayer 42 intervening between the MAC layer 40 and the physical layer 44. Herein, the sublayer 42 will be referred to as H-ARQ control sublayer 42. The H-ARQ control sublayer 42 performs a part of the operation that was conventionally performed in the MAC layer 30 of FIG. 3. The H-ARQ control sublayer 42 is structurally included in the physical layer 44, and functionally included in the MAC layer 40. The H-ARQ control sublayer 42 is structured so that it should perform only the operation of determining whether to retransmit data on behalf of the MAC layer 40, thereby reducing H-ARQ processing time for the same data.

The improved structure of FIG. 4 increases H-ARQ processing speed, compared with the conventional structure. The structure of FIG. 3 receives a NAK signal through one packet transmission, and round trip delay of a minimum of about 200 msec occurs until a time point where a retransmission packet is transmitted. However, in the structure of FIG. 4, short round trip delay of about several milliseconds occurs. In the case where F-PDCH uses adaptive modulation and coding (AMC) that changes a modulation scheme and a coding rate according to a channel condition, such short round trip delay is particularly useful. In order to substantially manage H-ARQ using the interlayer structure between the upper layer and the physical layer, a retransmission protocol for a transmitter according to a retransmission request (i.e., NAK transmitted from a receiver) is required. For this, a CDMA2000 1× system specified by 3GPP2 uses AAIR (Asynchronous and Adaptive Increment Redundancy). According to AAIR, a base station asynchronously performs packet transmission to a mobile station depending on forward channel quality information reported to the mobile station, and a modulation scheme, a coding rate and a slot length of the transmission packet are adaptively determined according to the channel quality. The packet, initial transmission of which failed, is retransmitted, and a code symbol pattern (or subpacket) transmitted at retransmission can be different from a code symbol pattern transmitted at initial transmission. AAIR increases the signal-to-noise ratio (SNR) of packet data according to an increase in the number of retransmissions, and increases the coding gain in proportion according to a decrease in a coding rate, thereby improving packet data transmission/reception performance.

Figure 5:
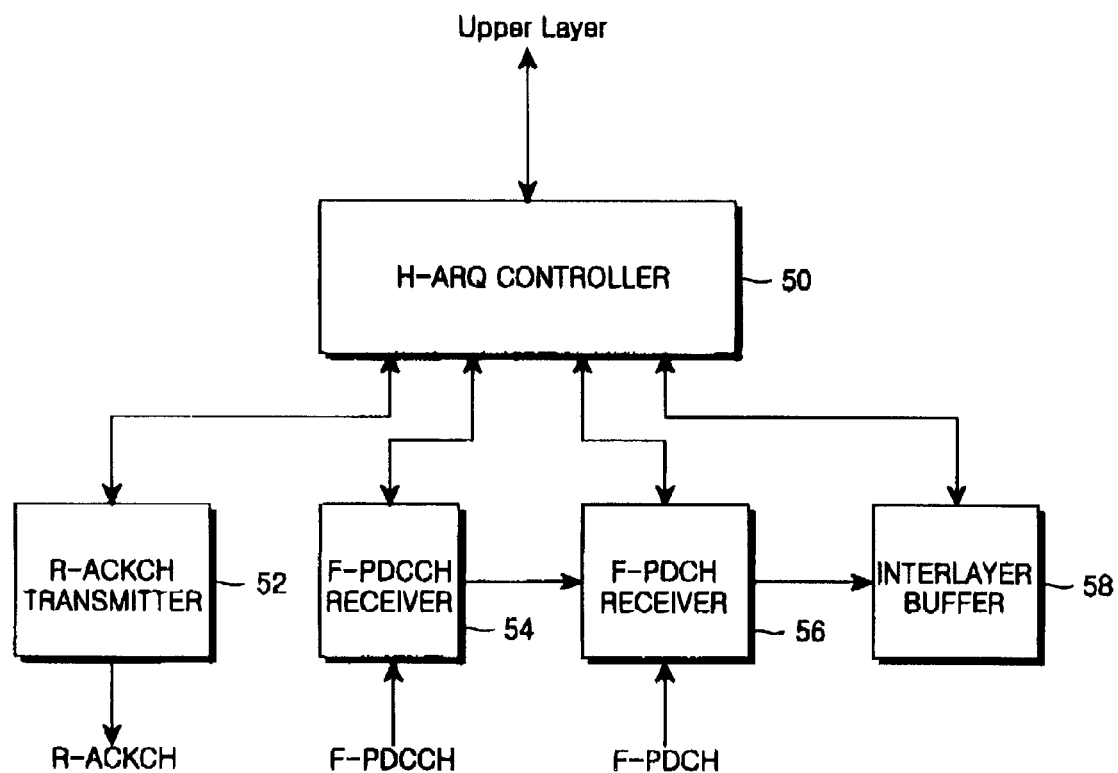
FIG. 5 is a block diagram illustrating a hierarchical structure of a mobile station according to a preferred embodiment of the present invention.

FIG. 5 is a block diagram illustrating a hierarchical structure of a mobile station according to a preferred embodiment of the present invention. In FIG. 5, an H-ARQ controller 50 corresponds to the H-ARQ control sublayer 42, and the R-ACKCH transmitter 52, F-PDCCH receiver 54 and F-PDCH receiver 56 correspond to the physical layer 44. The F-PDCH receiver 56 is identical in structure to the receiver described in conjunction with FIG. 2.

Referring to FIG. 5, the R-ACKCH transmitter 52 generates an ACK signal or a NAK signal to be transmitted over R-ACKCH, under the control of the H-ARQ controller 50. The F-PDCCH receiver 54 decodes control information received over F-PDCCH, and provides the decoded result to the H-ARQ controller 50 and the F-PDCH receiver 56. The F-PDCH receiver 56, connected to an interlayer buffer 58 for received packets, receives each packet data received over F-PDCH, and performs demodulation and decoding on the received packet data under the control of the H-ARQ controller 50. The data successfully decoded by the F-PDCH receiver 56 is stored in the interlayer buffer 58 under the control of the H-ARQ controller 50. The interlayer buffer 58, under the control of the H-ARQ controller 50, delivers the stored data to an upper layer at periods determined such that the upper layer does not have a large load.

The H-ARQ controller 50 determines whether it will perform retransmission or initial transmission on packet data received by the F-PDCH receiver 56, depending on control information MAC_ID, ARQ_ID, SP_ID, EP_SIZE and AI_SN received by the F-PDCCH receiver 54, and controls the R-ACKCH transmitter 52 according to the processing result thereby to generate an ACK or NAK signal.

A binary detection scheme for detecting ACK and NAK, or a tri-state detection scheme for detecting ACK, NAK and Silence, can be used as a detection scheme in which a mobile station informs a base station of success in decoding an encoder packet over R-ACKCH. The term "Silence" means actual no-response where R-ACKCH is gated off.

Figure 6:
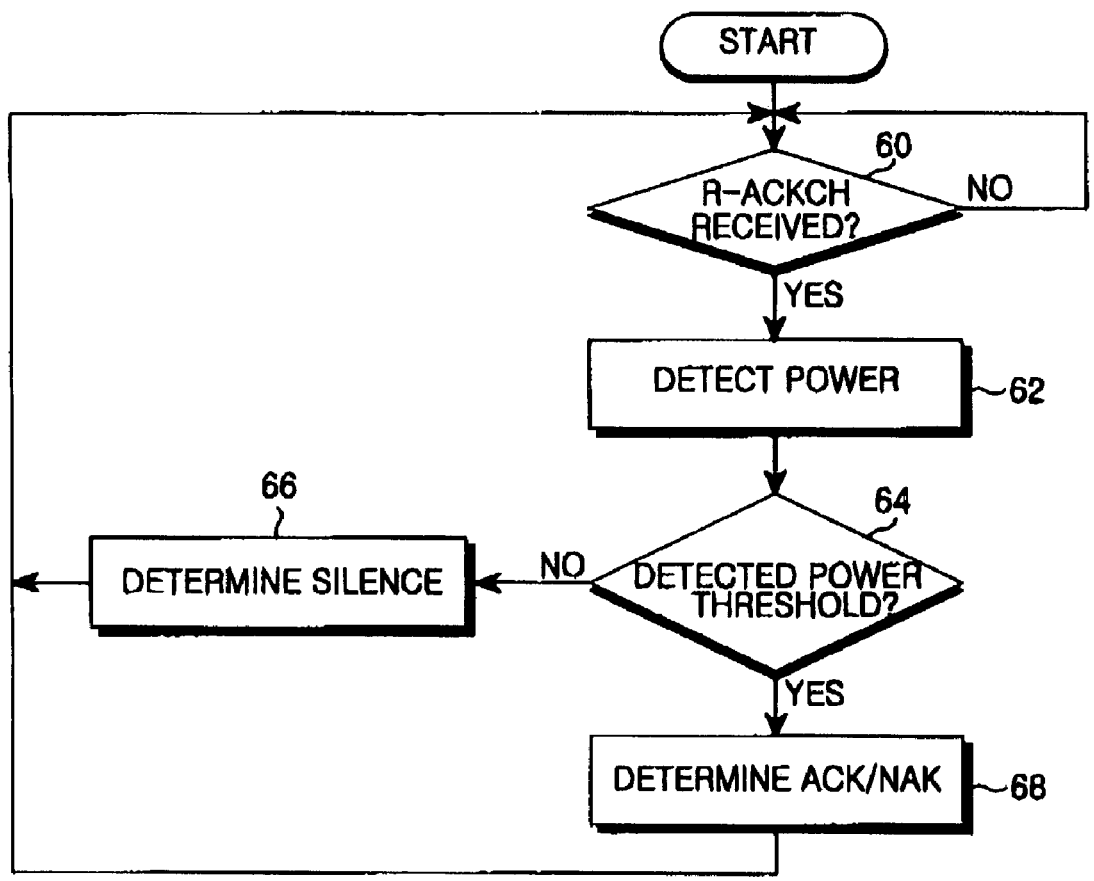
FIG. 6 is a flowchart illustrating an operation of detecting an H-ARQ response by a base station employing a typical tri-state detection scheme.

FIG. 6 illustrates a procedure for detecting ACK, NAK or Silence by an R-ACKCH receiver of a base station in the case where the tri-state detection scheme is adopted. Referring to FIG. 6, a base station extracts an R-ACKCH signal by despreading a received signal with a spreading code assigned to R-ACKCH (Step 60), and then detects a power (or energy) level by separating the R-ACKCH signal into an in-phase (I) channel signal and a quadrature-phase (Q) channel signal and summing up squares of the separated channel signals (Step 62). The detected power level is compared with a predetermined threshold (Step 64). If the detected power level is lower than the threshold, it means that R-ACKCH is gated off by a mobile station, so the base station detects Silence (Step 66).

However, if the detected power level is higher than or equal to the threshold, the base station decodes the R-ACKCH signal, determines whether the decoding result corresponds to ACK or NAK, and then transmits a new subpacket for the same encoder packet (retransmission process) or transmits an initial transmission subpacket for a new encoder packet (initial transmission process) according to the determination result (Step 68).

As described above, a base station can repeatedly transmit the same encoder packet according to a response from a mobile station. In this case, the mobile station should determine whether a currently received packet is a retransmitted packet or an initially transmitted packet, and perform a process corresponding thereto. If the mobile station determines whether the currently received packet is a retransmitted packet depending only on whether it has previously transmitted an ACK or NAK, the mobile station may incorrectly interpret a response to R-ACKCH. As a result, the mobile station may perform unnecessary processing or mistakenly discard a received packet.

Therefore, in accordance with an embodiment of the present invention, a mobile station determines whether it will perform retransmission or initial transmission on a currently received packet depending upon a previous response to R-ACKCH and/or control information on F-PDCCH. Retransmission-related information included in the control information on F-PDCCH includes; ARQ_ID indicating an ARQ channel to which a transmission packet belongs; EP_SIZE indicating a size of an encoder packet; SP_ID indicating sequence of a subpacket; and an AI_SN flag indicating initial transmission (NEW) or retransmission (CONTINUE) of a transmission packet.

With reference to the accompanying drawings, a description will now be made as to how a base station and a mobile station perform H-ARQ processing on one of plural ARQ channels based on retransmission-related information on F-PDCCH. Each ARQ channel is processed in the same way.

Figure 7:
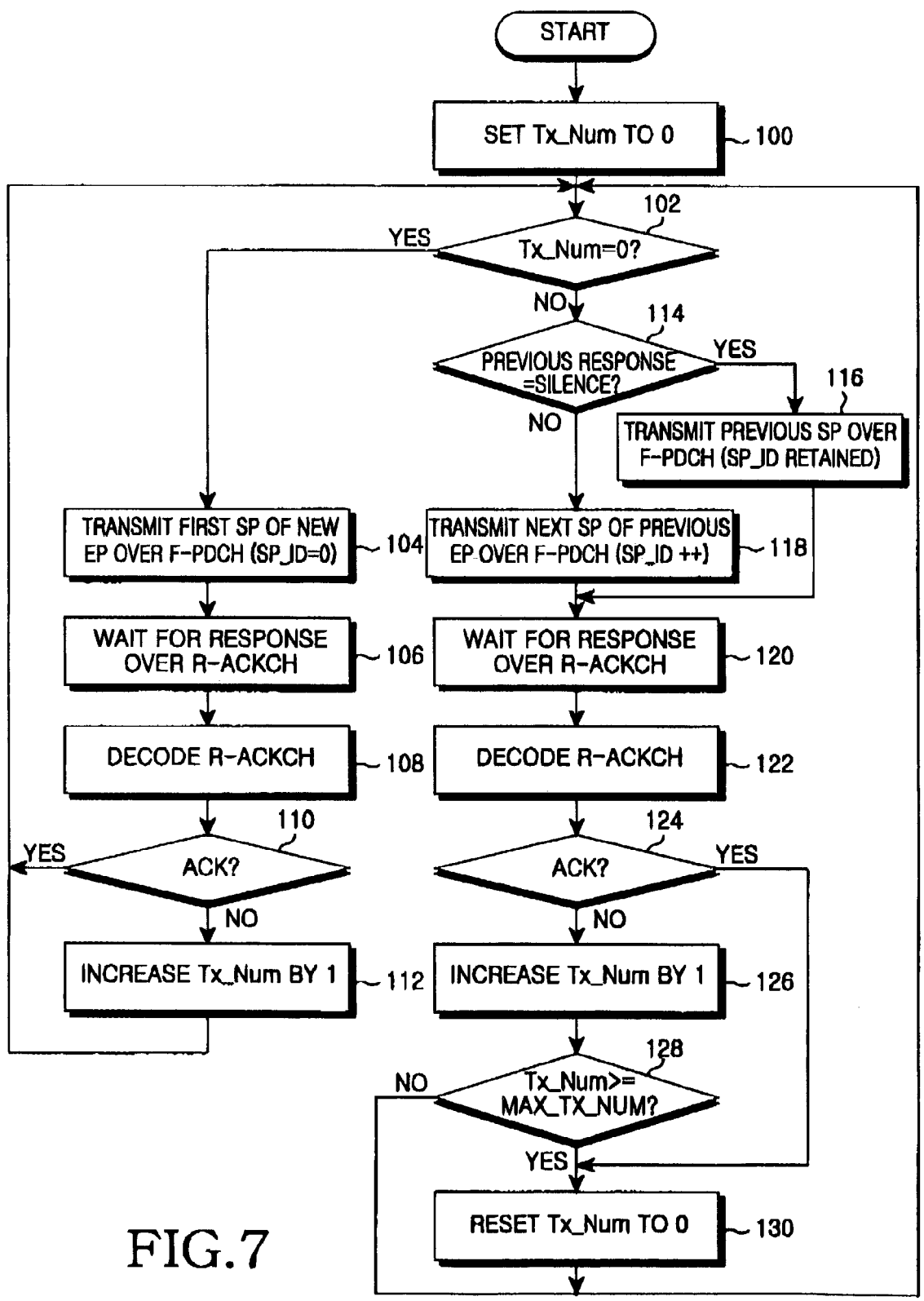
FIG. 7 is a flowchart illustrating an H-ARQ operation by a base station using MAC_ID, ARQ_ID, SP_ID and EP_SIZE according to an embodiment of the present invention.
Figure 8:
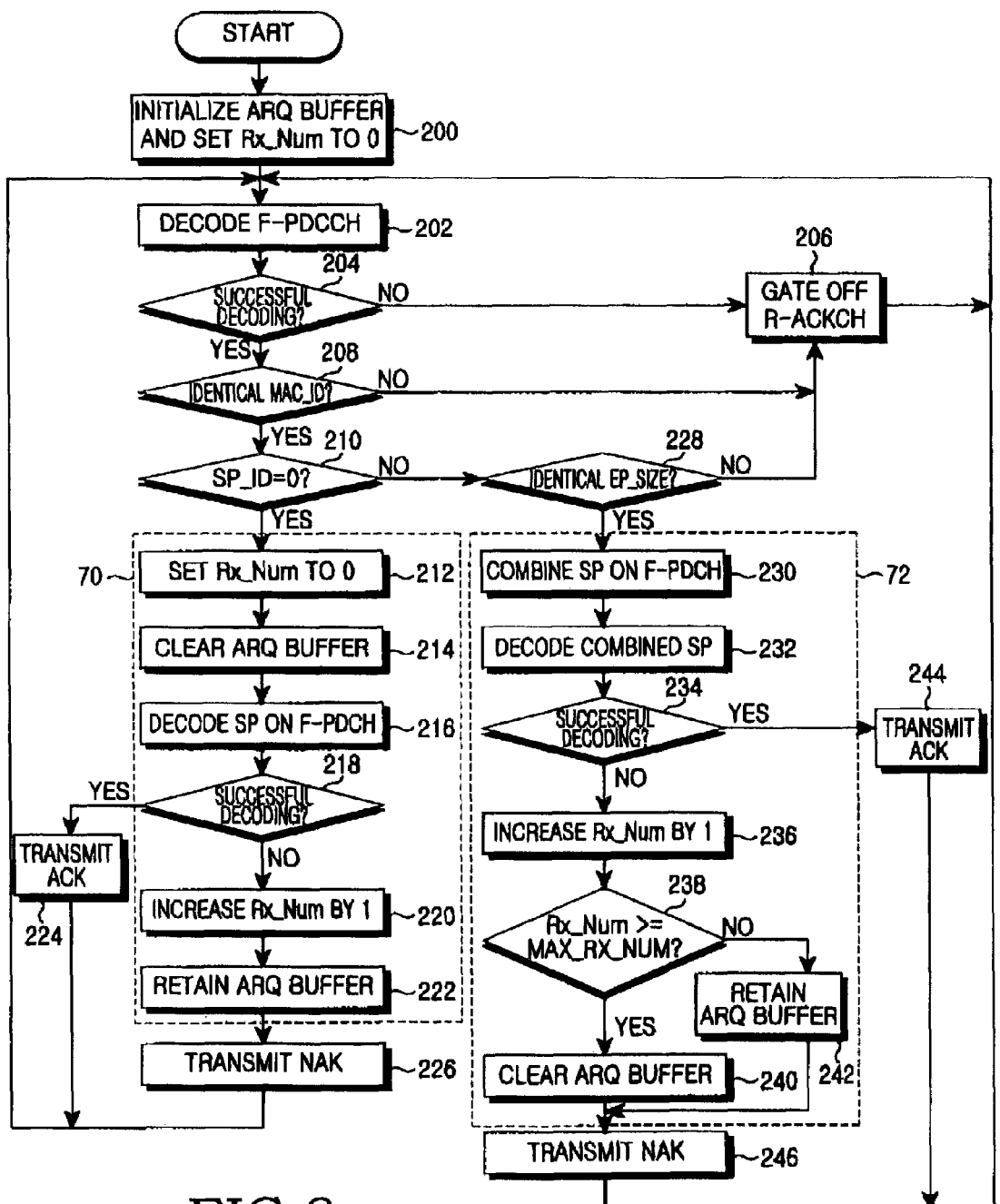
FIG. 8 is a flowchart illustrating an H-ARQ operation by a mobile station using MAC_ID, ARQ_ID, SP_ID and EP_SIZE according to an embodiment of the present invention.

FIGS. 7 to 12 illustrate the operation of performing H-ARQ processing in the case where a mobile station should necessarily receive an initially transmitted subpacket (SP_ID=0). As mentioned before, an initially transmitted subpacket includes a part or the whole of a systematic part in a coded bit stream. For successful decoding, the systematic part is relatively important as compared with a parity part. In FIGS. 7 to 12, when a mobile station misses F-PDCCH or misses an initially transmitted subpacket on F-PDCCH, the base station retransmits the initially transmitted subpacket in order to improve a decoding success rate of an encoder packet. FIGS. 7 to 12 illustrate an operation of performing H-ARQ processing depending upon elements selected from control information transmitted from a base station. Specifically, FIGS. 7 and 8 illustrate an operation of performing H-ARQ processing depending upon other elements except AI_SN.

FIGS. 7 and 8 are flowcharts illustrating H-ARQ operations by a base station and a mobile station depending upon MAC_ID, ARQ_ID, SP_ID and EP_SIZE according to an embodiment of the present invention. Herein, SP_ID=0 indicates initial transmission (or first transmission) on a first subpacket of a new encoder packet.

Referring to FIG. 7, a base station sets a transmission number Tx_Num to 0 (Step 100), and determines whether the transmission number Tx_Num is 0 in order to start a packet data service (Step 102).

If the transmission number Tx_Num is 0 ("Yes" path from decision step 102), the base station transmits control information including MAC_ID, ARQ_ID, SP_ID (herein SP_ID is set to 0) and EP_SIZE over F-PDCCH while transmitting an initial transmission subpacket of a new encoder packet to a mobile station over F-PDCH (Step 104), and then waits for a response from the mobile station (Step 106). Thereafter, the base station decodes R-ACKCH from the mobile station (Step 108), and analyzes the response to the transmitted subpacket from the mobile station (Step 110). If the response from the mobile station is ACK ("Yes") path from decision step 110), the base station returns to step 102 to transmit a new encoder packet. Otherwise, if the response from the mobile station is NAK or Silence, the base station increases the transmission number Tx_Num by 1 ("No" path from decision step 110) in order to retransmit the same encoder packet (Step 112), and then returns to step 102.

If it is determined in step 102 that the transmission number Tx_Num is not 0 ("No" path from decision step 102), the base station determines whether the last response received from the mobile station over R-ACKCH is Silence (Step 114). If the last response from the mobile station is Silence, i.e., if there is no previous response ("No" path from decision step 114), the base station transmits control information including previous SP_ID over F-PDCCH while retransmitting a previously transmitted subpacket over F-PDCH (Step 118). However, if the last response from the mobile station is not Silence, i.e., if there is a previous response ("Yes" path from decision step 114), the base station increases SP_ID of control information transmitted over F-PDCCH by 1 while transmitting a next subpacket of a previously transmitted encoder packet, over F-PDCH (Step 116). The SP_ID is set to a value indicating a retransmission number for the same encoder packet. For example, SP_ID is set to '01' for first retransmission, and '10' for second retransmission.

Thereafter, the base station waits for a response from the mobile station for the subpacket transmitted in step 116 or 118 (Step 120). The base station decodes R-ACKCH from the mobile station (Step 122), and analyzes a response from the mobile station for the subpacket transmitted in step 116 or 118 (Step 124). If the response from the mobile station is ACK ("Yes" path from decision step 124), the base station resets the transmission number Tx_Num to '0' in order to transmit a new encoder packet (Step 130), and then returns to step 102. However, if a response from the mobile station is NAK or Silence ("No" path from decision step 124), the base station increases the transmission number Tx_Num by 1 (Step 126), and then proceeds to step 128.

In step 128, the transmission number Tx_Num is compared with a previously set maximum transmission number MAX_TX_NUM. The maximum transmission number MAX_TX_NUM prevents the base station from infinitely retransmitting the same packet data. If the transmission number Tx_Num is larger than or equal to the maximum transmission number MAX_TX_NUM ("Yes" path from decision step 128), the base station resets the transmission number Tx_Num to '0' in order to transmit a new encoder packet (Step 130), and then returns to step 102. However, if the transmission number Tx_Num is smaller than the maximum transmission number MAX_TX_NUM ("No" path from decision step 128), the base station returns to step 102 without changing the transmission number Tx_Num in order to retransmit the same encoder packet.

Referring to FIG. 8, a mobile station initializes an ARQ buffer and sets a reception number Rx_Num to 0 in order to receive a packet data service (Step 200). Thereafter, the mobile station decodes F-PDCCH from a base station (Step 202), and determines whether a CRC error is detected from control information acquired by decoding the F-PDCCH, thereby determining whether the mobile station made a successful in decoding (Step 204). The control information acquired by decoding the F-PDCCH includes MAC_ID, SP_ID and EP_SIZE. If the decoding failed ("No" path from decision step 204), R-ACKCH is gated off (Step 206). In this case, nothing is transmitted over the R-ACKCH, and this is regarded as Silence by the base station.

If it is determined in step 204 that decoding of F-PDCCH was successfully performed ("Yes" path from decision step 204), the mobile station determines whether the MAC_ID acquired by the decoding is identical to its own MAC_ID, thereby determining whether there is any packet data transmitted thereto (Step 208). If they are not identical to each other ("No" path from decision step 208), R-ACKCH is gated off (Step 206).

Otherwise, if the MAC_IDs are identical to each other in step 208 ("Yes" path from decision step 208), the mobile station determines whether SP_ID acquired by the decoding is set to '0' that indicates initial transmission (Step 210). If the SP_ID is set to '0' ("Yes" path from decision step 210), the mobile station sets the reception number Rx_Num to '0' (Step 212), and then clears the ARQ buffer (Step 214). Thereafter, the mobile station stores a subpacket received over F-PDCH, in the ARQ buffer, and acquires an encoder packet by decoding the received subpacket (Step 216). If no error is detected from the encoder packet acquired by the decoding in step 216, i.e., if decoding of F-PDCH is successfully performed ("Yes" path from decision step 218), the mobile station transmits ACK over R-ACKCH (Step 224). However, if the decoding performed in step 216 failed ("No" path from decision step 218), the mobile station increases the reception number Rx_Num by 1 (Step 220), and transmits NAK over R-ACKCH (Step 226) while retaining the data stored in the ARQ buffer (Step 222). Steps 212 to 222 in block 70 drawn in a dotted line represent a decoding process caused by initial transmission (hereinafter referred to as "initial transmission-related decoding process"), performed by the mobile station.

However, if it is determined in step 210 that SP_ID is not set to '0' ("No" path from the decision step 210), the mobile station compares EP_SIZE acquired by decoding the F-PDCCH with previously received EP_SIZE (Step 228). If the EP_SIZEs are not identical to each other ("No" path from decision step 228), the mobile station gates off the R-ACKCH (Step 206), and then returns to step 202, determining that it is not possible to restore an encoder packet since a retransmitted subpacket is received before an initially transmitted subpacket is received.

If, as a result of the comparison in step 228, it is determined that the EP_SIZEs are identical to each other ("Yes" path from decision step 228), the mobile station code/packet-combines a subpacket received over F-PDCH with previous subpackets previously received and stored in the ARQ buffer, and stores the combined packet in the ARQ buffer (Step 230). Thereafter, the mobile station acquires an encoder packet by turbo-decoding the combined subpacket (Step 232). If no error is detected from the encoder packet, i.e., decoding is successfully performed ("Yes" path from decision step 234), the mobile station transmits ACK over R-ACKCH (Step 244).

However, if the decoding is failed ("No" path from decision step 234), the mobile station increases the reception number Rx_Num by 1 (Step 236), and then compares the increased reception number Rx_Num with a predetermined maximum reception number MAX_RX_NUM (Step 238). The maximum reception number MAX_RX_NUM prevents the mobile station from endlessly waiting for retransmission of the same encoder packet. If the reception number Rx_Num is larger than or equal to the maximum reception number MAX_RX_NUM ("Yes" path from decision step 238), the mobile station clears the ARQ buffer (Step 240), and transmits NAK over R-ACKCH (Step 246). If the reception number Rx_Num is smaller than the maximum reception number MAX_RX_NUM ("No" path from decision step 238), the mobile station transmits NAK over R-ACKCH (Step 244) while retaining the ARQ buffer (Step 242). The steps 230 to 242 in block 72 drawn by a dotted line represent a decoding process caused by retransmission (hereinafter referred to as "retransmission-related decoding process"), performed by the mobile station.

Figure 9:
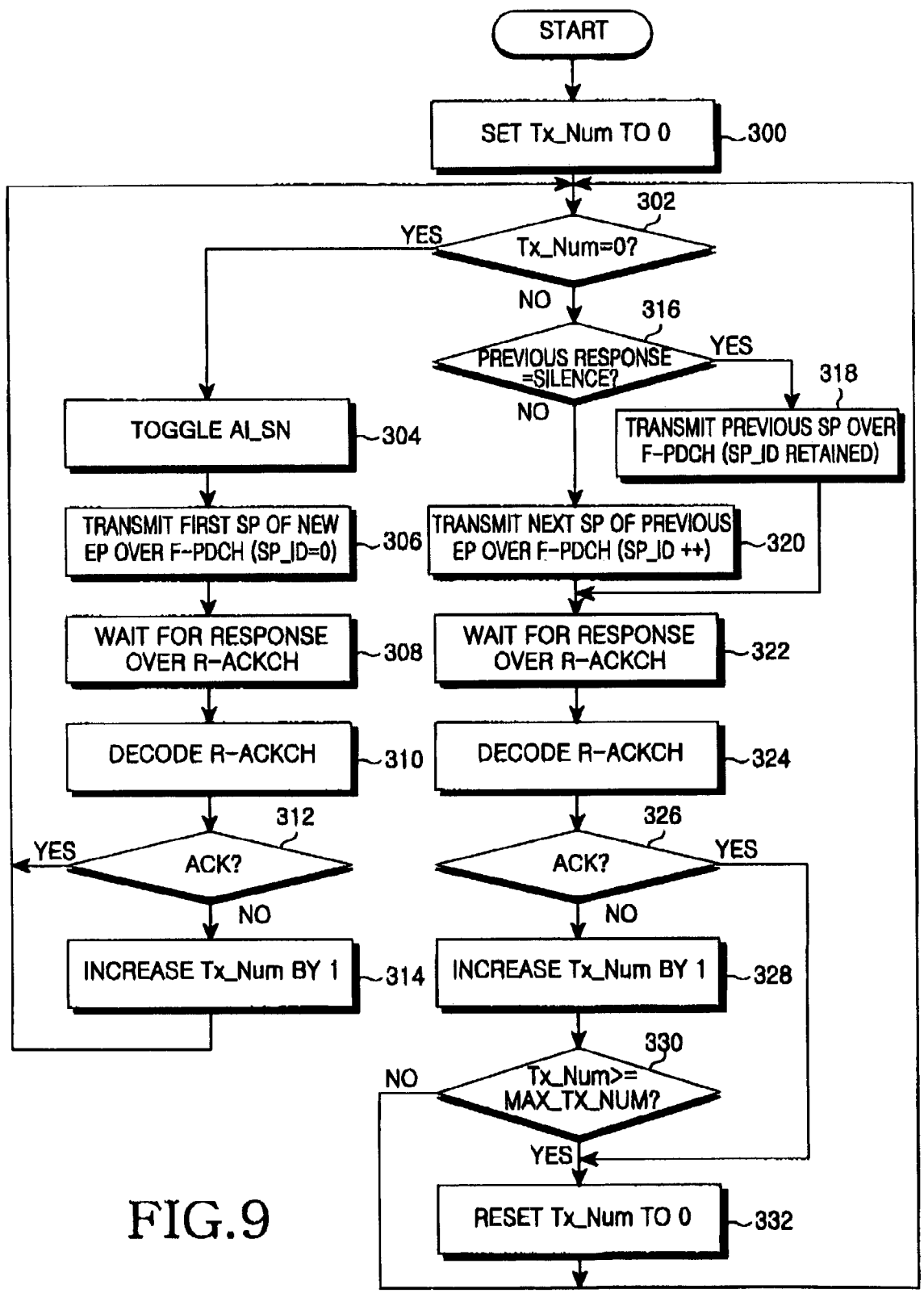
FIG. 9 is a flowchart illustrating an H-ARQ operation by a base station using MAC_ID, ARQ_ID, SP_ID, EP_SIZE and AI_SN according to an embodiment of the present invention.
Figure 10:
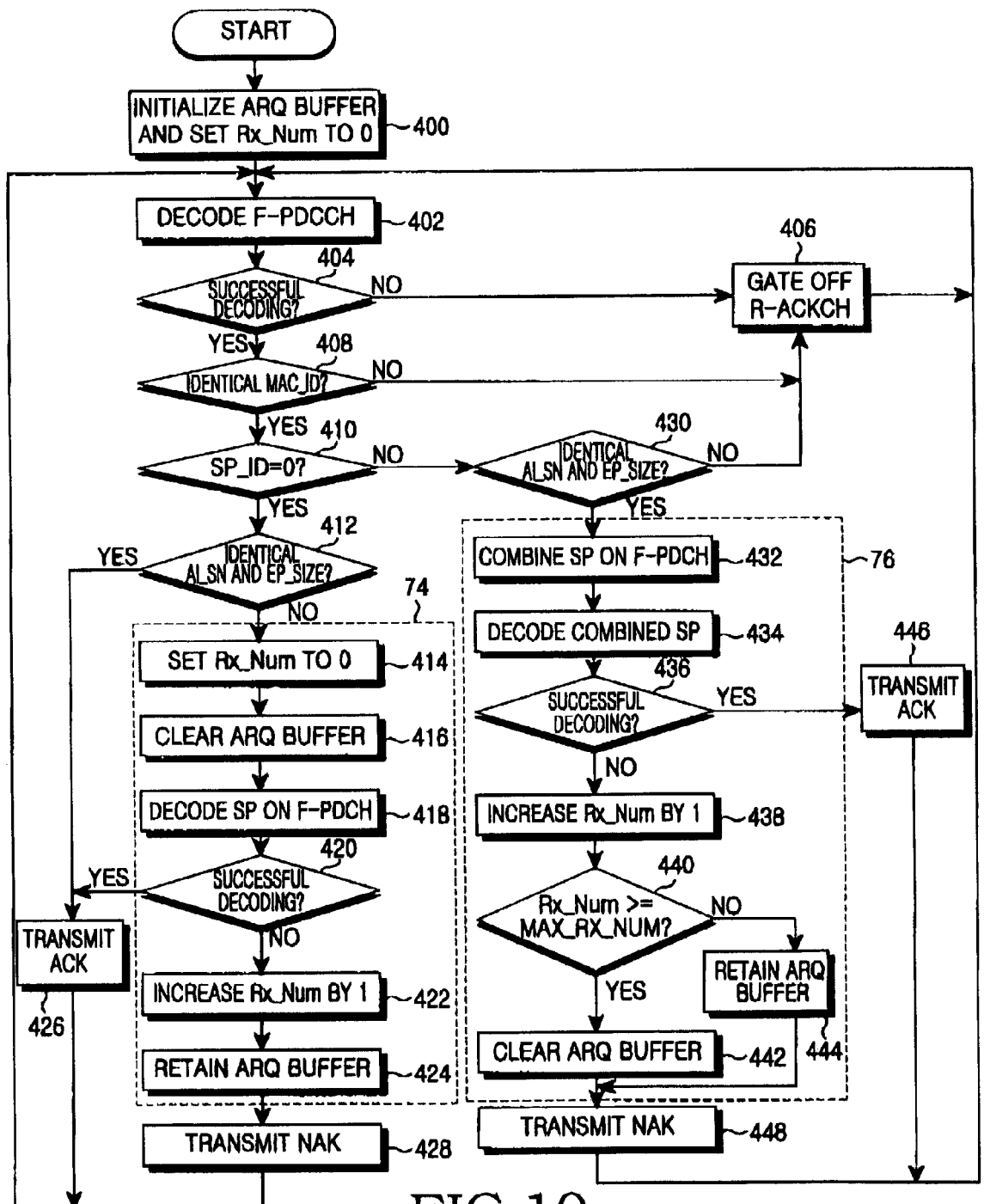
FIG. 10 is a flowchart illustrating an H-ARQ operation by a mobile station using MAC_ID, ARQ_ID, SP_ID, EP_SIZE and AI_SN according to an embodiment of the present invention.

FIGS. 9 and 10 are flowcharts illustrating H-ARQ operations by a base station and a mobile station depending upon MAC_ID, ARQ_ID, SP_ID, EP_SIZE and AI_SN according to an embodiment of the present invention. Likewise, SP_ID=0 indicates initial transmission on a first subpacket of a new encoder packet.

Referring to FIG. 9, a base station sets a transmission number Tx_Num to 0 (Step 300), and determines whether the transmission number Tx_Num is 0 in order to start a packet data service (Step 302).

If the transmission number Tx_Num is 0 ("Yes" path from decision step 302), the base station toggles an AI_SN value, i.e., changes the AI_SN value from 0 to 1 or from 1 to 0 (Step 304), transmits control information including MAC_ID, ARQ_ID, SP_ID (herein SP_ID is set to 0), EP_SIZE and the toggled AI_SN over F-PDCCH, while transmitting an initial transmission subpacket of a new encoder packet to a mobile station over F-PDCH (Step 306). The AI_SN, together with the EP_SIZE, serves as a double checker that partially compensates for any ambiguity in the sequence of encoder packets. A mobile station determines whether current transmission is retransmission on the same encoder packet, using both the AI_SN and the EP_SIZE.

Thereafter, the base station waits for a response from the mobile station for the transmitted subpacket (Step 308). The base station decodes R-ACKCH from the mobile station (Step 310), and analyzes a response from the mobile station for the transmitted subpacket (Step 312). If a response from the mobile station is ACK ("Yes" path from decision step 312), the base station returns to step 302 to transmit a new encoder packet. Otherwise, if the response from the mobile station is NAK or Silence ("No" path from decision step 312), the base station increases the transmission number Tx_Num by 1 in order to retransmit the same encoder packet (Step 314), and then returns to step 302.

If it is determined in step 302 that the transmission number Tx_Num is not 0 ("No" path from decision step 302), the base station determines whether the last response received from the mobile station over R-ACKCH is Silence (Step 316). If the last response from the mobile station is Silence ("No" path from decision step 316), i.e., if there is no previous response, the base station transmits control information including previous SP_ID over F-PDCCH while retransmitting a previously transmitted subpacket over F-PDCH (Step 320). However, if the last response from the mobile station is not Silence, i.e., if there is a previous response ("Yes" path from decision step 316), the base station increases SP_ID of control information transmitted over F-PDCCH by 1, while transmitting a next subpacket of a previously transmitted encoder packet, over F-PDCH (Step 318). After both steps 318 and 320, the base station waits for a response from the mobile station for the subpacket transmitted in step 318 or 320 (Step 322). The base station decodes R-ACKCH from the mobile station (Step 324), and analyzes a response from the mobile station for the subpacket transmitted in step 318 or 320 (Step 326). If a response from the mobile station is ACK ("Yes" path from decision step 326), the base station resets the transmission number Tx_Num to '0' in order to transmit a new encoder packet (Step 332), and then returns to step 302. However, if a response from the mobile station is NAK or Silence ("No" path from decision step 326), the base station increases the transmission number Tx_Num by 1 (Step 328), and then proceeds to step 330.

In step 330, the transmission number Tx_Num is compared with a previously set maximum transmission number MAX_TX_NUM. If the transmission number Tx_Num is larger than or equal to the maximum transmission number MAX_TX_NUM ("Yes" path from decision step 330), the base station resets the transmission number Tx_Num to '0' in order to transmit a new encoder packet (Step 332), and then returns to step 302. However, if the transmission number Tx_Num is smaller than the maximum transmission number MAX_TX_NUM ("No" path from decision step 330), the base station returns to step 302 without changing the transmission number Tx_Num in order to retransmit the same encoder packet.

Referring to FIG. 10, a mobile station initializes an ARQ buffer and sets a reception number Rx_Num to 0 in order to receive a packet data service (Step 400). Thereafter, the mobile station decodes F-PDCCH from a base station (Step 402), and determines whether a CRC error is detected from control information acquired by decoding the F-PDCCH thereby determining whether the mobile station was successful in decoding (Step 404). The control information acquired by decoding the F-PDCCH includes MAC_ID, SP_ID, EP_SIZE and AI_SN. If the decoding failed ("No" path from decision step 404), R-ACKCH is gated off (Step 406). If it is determined in step 404 that decoding of F-PDCCH was successfully performed ("Yes" path from decision step 404), the mobile station then further determines whether MAC_ID acquired by the decoding is identical to its own MAC_ID, thereby determining whether the F-PDCCH had any information transmitted to the mobile station itself (Step 408). If they are not identical to each other ("No" path from decision step 408), R-ACKCH is gated off (Step 406).

Otherwise, if the MAC_IDs are identical to each other in step 408 ("Yes" path from decision step 408), the mobile station determines whether SP_ID acquired by the decoding is set to '0' (Step 410). If the SP_ID is set to '0' ("Yes" path from decision step 410), the mobile station determines whether the AI_SN and EP_SIZE acquired by the decoding are identical to previously received AI_SN and EP_SIZE (Step 412). If the AI_SN and EP_SIZE are both identical to the previously received AI_SN and EP_SIZE ("Yes" path from decision step 412), the mobile station transmits ACK over R-ACKCH without decoding F-PDCH (Step 426), determining that although a base station normally received a previously transmitted encoder packet, the base station failed to normally receive ACK transmitted from the mobile station.

However, if both the AI_SN and EP_SIZE are not identical to the previously received AI_SN and EP_SIZE ("No" path from decision step 412), the mobile station sets the reception number Rx_Num to '0' (Step 414), and then clears the ARQ buffer (Step 416). Thereafter, the mobile station stores a subpacket received over F-PDCH, in the ARQ buffer, and acquires an encoder packet by decoding the received subpacket (Step 418). If no error is detected from the encoder packet acquired by the decoding in step 418, i.e., if decoding of F-PDCH is successfully performed ("Yes" path from decision step 420), the mobile station transmits ACK over R-ACKCH (Step 426). However, if the decoding performed in step 418 is failed ("No" path from decision step 420), the mobile station increases the reception number Rx_Num by 1 (Step 422), and transmits NAK over R-ACKCH (Step 428) while retaining the data stored in the ARQ buffer (Step 424).

The steps 414 to 424 in block 74 drawn by a dotted line represent an initial transmission-related decoding process performed by the mobile station.

However, if it is determined in step 410 that SP_ID is not set to '0' ("No" path from decision step 410), the mobile station compares AI_SN and EP_SIZE acquired by decoding the F-PDCCH with previously received AI_SN and EP_SIZE (Step 430). If both the AI_SN and EP_SIZE are not identical to the previously received AI_SN and EP_SIZE ("No" path from decision step 430), it means that a retransmitted subpacket is received before an initially received subpacket was received. Therefore, the mobile station will "gate off" the R-ACKCH in order to retransmit the initially transmitted subpacket (Step 406), and then returns to step 402.

As a result of the comparison in step 430, if the AI_SN and EP_SIZE are both identical to the previously received AI_SN and EP_SIZE ("Yes" path from decision step 430), the mobile station code/packet-combines a subpacket received over F-PDCH with previous subpackets previously received and stored in the ARQ buffer, and stores the combined packet in the ARQ buffer (Step 432). Thereafter, the mobile station acquires an encoder packet by turbo-decoding the combined subpacket (Step 434). If no error is detected from the encoder packet, i.e., decoding is successfully performed ("Yes" path from decision step 436), the mobile station transmits ACK over R-ACKCH (Step 446).

However, if the decoding is failed ("No" path from decision step 436), the mobile station increases the reception number Rx_Num by 1 (Step 438), and then compares the increased reception number Rx_Num with a predetermined maximum reception number MAX_RX_NUM (Step 440). If the reception number Rx_Num is larger than or equal to the maximum reception number MAX_RX_NUM ("Yes" path from decision step 440), the mobile station clears the ARQ buffer (Step 442), and transmits NAK over R-ACKCH (Step 448). If the reception number Rx_Num is smaller than the maximum reception number MAX_RX_NUM ("No" path from decision step 440), the mobile station transmits NAK over R-ACKCH (Step 446) while retaining the ARQ buffer (Step 444). The steps 432 to 444 in block 76 drawn by a dotted line represent a retransmission-related decoding process performed by the mobile station.

With reference to FIGS. 7 to 10, operations of the base and mobile stations have been described on the assumption that an initial transmission subpacket with SP_ID=0 must be necessarily received. Therefore, when an initial transmission packet is missing, it is not possible to restore an encoder packet. In order to make up for the defects, FIGS. 11 and 12 illustrate operations of the base and mobile station, wherein the mobile station can decode an encoder packet even before an initially transmitted subpacket is received.

Figure 11:
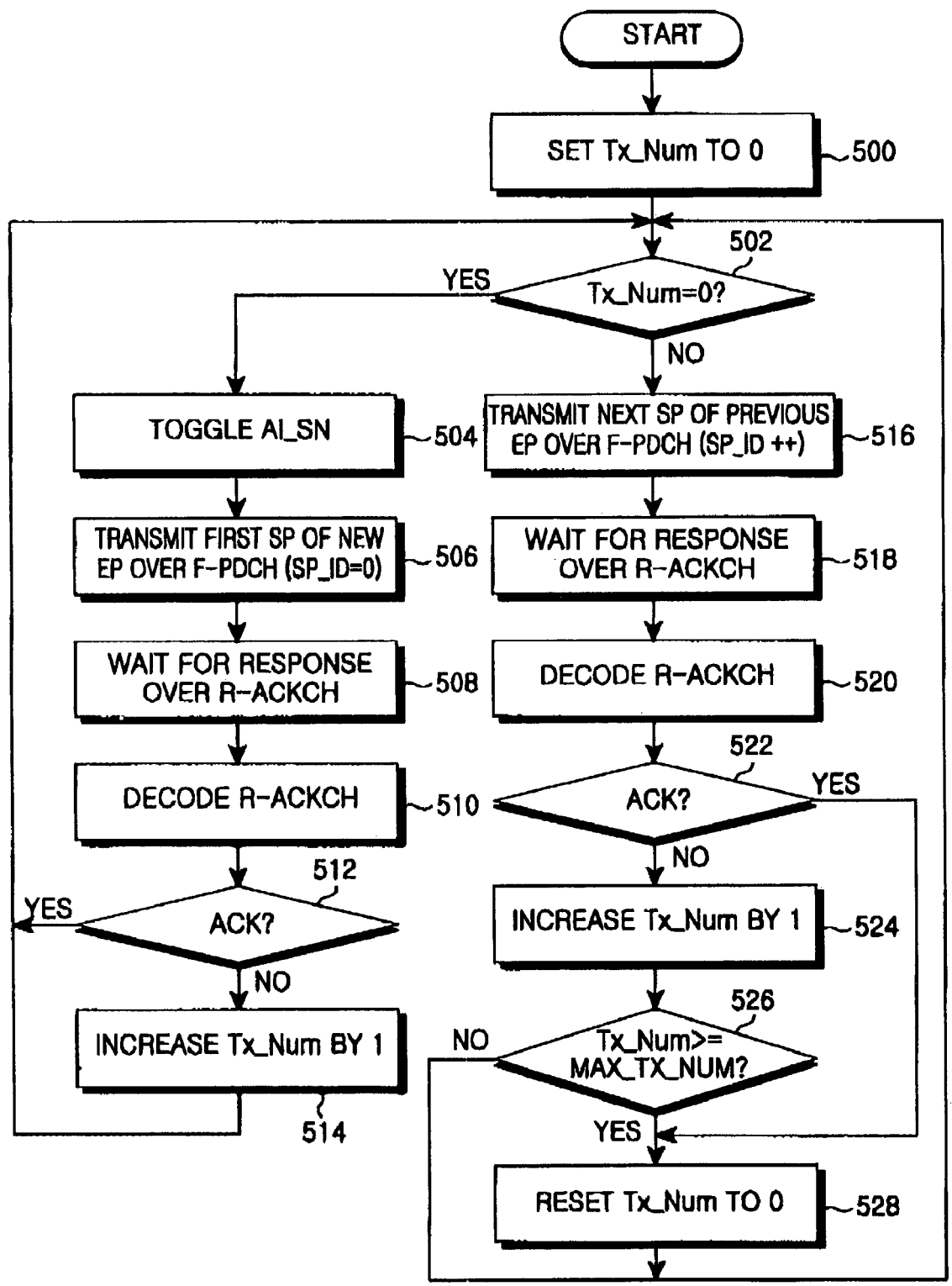
FIG. 11 is a flowchart illustrating an H-ARQ operation by a base station according to another embodiment of the present invention.
Figure 12:
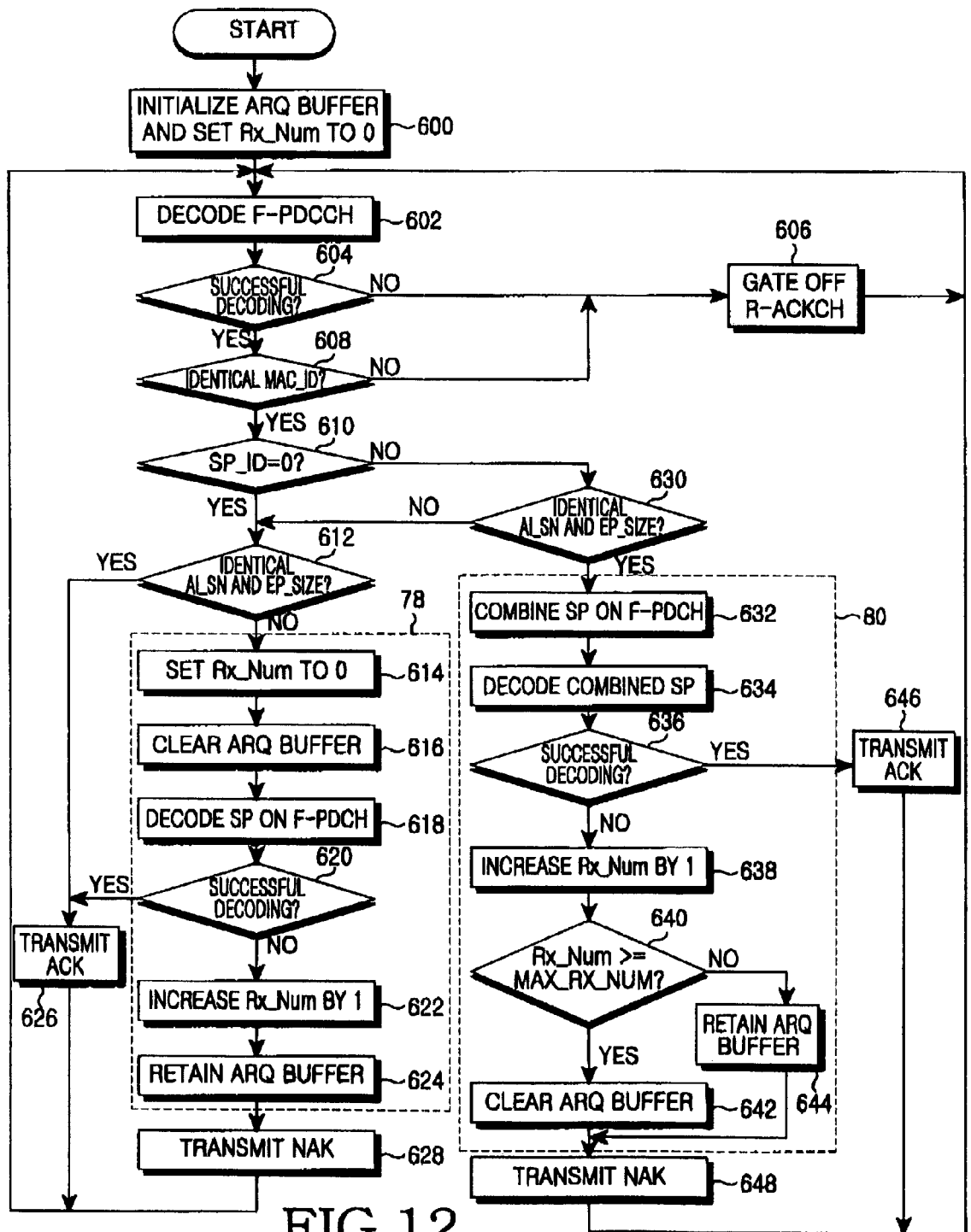
FIG. 12 is a flowchart illustrating an H-ARQ operation by a mobile station according to another embodiment of the present invention.

FIGS. 11 and 12 are based on the fact that although a mobile station misses a first subpacket and performs decoding on its succeeding subpackets, there is a relatively high probability that an encoder packet can be successfully decoded. In FIGS. 11 and 12, it is determined that the penalty of turbo decoding due to missing (loss) of an initially transmitted subpacket is negligible. In addition, FIGS. 11 and 12 illustrate an operation in which a base station unconditionally transmits a retransmission subpacket without determining presence/absence of a previous response when it decides upon retransmission. However, in an alternative embodiment of the present invention, when there is no previous response, a base station can retransmit a previous subpacket with a simple modification.

It will be assumed herein that the H-ARQ operation is performed using MAC_ID, ARQ_ID, SP_ID, EP_SIZE and AI_SN, and SP_ID=0 indicates initial transmission on a first subpacket of a new encoder packet.

Referring to FIG. 11, a base station sets a transmission number Tx_Num to 0 (Step 500), and determines whether the transmission number Tx_Num is 0 in order to start a packet data service (Step 502).

If the transmission number Tx_Num is 0 ("Yes" path from decision step 502), the base station toggles an AI_SN value, i.e., changes the AI_SN value from 0 to 1 or from 1 to 0 (Step 504), transmits control information including MAC_ID, ARQ_ID, SP_ID (herein SP_ID is set to 0), EP_SIZE and the toggled AI_SN over F-PDCCH while transmitting an initial transmission subpacket of a new encoder packet to a mobile station over F-PDCH (Step 506). Thereafter, the mobile station waits for a response from the mobile station for the transmitted subpacket (Step 508). The base station decodes R-ACKCH from the mobile station (Step 510), and analyzes a response from the mobile station for the transmitted subpacket (Step 512). If a response from the mobile station is ACK ("Yes" path from decision step 512), the base station returns to step 502 to transmit a new encoder packet. Otherwise, if a response from the mobile station is NAK or Silence ("No" path from decision step 512), the base station increases the transmission number Tx_Num by 1 (Step 514), and then returns to step 502.

If it is determined in step 502 that the transmission number Tx_Num is not 0 ("No" path from decision step 502), the base station increases the SP_ID of control information transmitted over F-PDCCH by 1, while transmitting a next subpacket of a previously transmitted encoder packet, over F-PDCH (Step 516).

Thereafter, the base station waits for a response from the mobile station for the subpacket transmitted in step 516 (Step 518). The base station decodes R-ACKCH from the mobile station (Step 520), and analyzes a response from the mobile station for the subpacket transmitted in step 516 (Step 522). If a response from the mobile station is ACK ("Yes" path from decision step 522), the base station resets the transmission number Tx_Num to '0' in order to transmit a new encoder packet (Step 528), and then returns to step 502. However, if a response from the mobile station is NAK or Silence ("No" path from decision step 522), the base station increases the transmission number Tx_Num by 1 (Step 524), and then proceeds to step 526.

In step 526, the transmission number Tx_Num is compared with a previously set maximum transmission number MAX_TX_NUM. If the transmission number Tx_Num is larger than or equal to the maximum transmission number MAX_TX_NUM ("Yes" path from decision step 526), the base station resets the transmission number Tx_Num to '0' in order to transmit a new encoder packet (Step 528), and then returns to step 502. However, if the transmission number Tx_Num is smaller than the maximum transmission number MAX_TX_NUM ("No" path from decision step 526), the base station returns to step 502 without changing the transmission number Tx_Num in order to retransmit the same encoder packet.

Referring to FIG. 12, a mobile station initializes an ARQ buffer and sets a reception number Rx_Num to 0 in order to receive a packet data service (Step 600). Thereafter, the mobile station decodes F-PDCCH from a base station (Step 602), and determines whether a CRC error is detected from control information acquired by decoding the F-PDCCH, thereby determining whether the mobile station made a successful decoding (Step 604). The control information acquired by decoding the F-PDCCH includes MAC_ID, SP_ID, EP_SIZE and AI_SN. If the decoding failed ("No" path from decision step 604), R-ACKCH is gated off (Step 606). If it is determined in step 604 that decoding of F-PDCCH is successfully performed ("Yes" path from decision step 604), the mobile station determines whether MAC_ID acquired by the decoding is identical to its own MAC_ID, thereby determining whether the F-PDCCH has any information transmitted to the mobile station itself (Step 608). If they are not identical to each other ("No" path to decision step 608), R-ACKCH is gated off (Step 606).

Otherwise, if the MAC_IDs are identical to each other in step 608 ("Yes" path from decision step 608), the mobile station determines whether SP_ID acquired by the decoding is set to '0' that indicates initial transmission (Step 610). If the SP_ID is set to '0' ("Yes" path from decision step 610), the mobile station determines whether the AI_SN and EP_SIZE acquired by the decoding are identical to previously received AI_SN and EP_SIZE (Step 612). If the AI_SN and EP_SIZE are both identical to the previously received AI_SN and EP_SIZE, ("Yes" path from decision step 612) the mobile station transmits ACK over R-ACKCH (Step 626).

However, if both the AI_SN and EP_SIZE are not identical to the previously received AI_SN and EP_SIZE ("No" path from decision step 612), the mobile station sets the reception number Rx_Num to '0' (Step 614), and then clears the ARQ buffer (Step 616). Thereafter, the mobile station stores a subpacket received over F-PDCH, in the ARQ buffer, and acquires an encoder packet by decoding the received subpacket (Step 618). If no error is detected from the encoder packet acquired by the decoding in step 618, i.e., if decoding of F-PDCH is successfully performed ("Yes" path from decision step 620), the mobile station transmits ACK over R-ACKCH (Step 626). However, if the decoding performed in step 618 is failed ("No" path from decision step 620), the mobile station increases the reception number Rx_Num by 1 (Step 622), and transmits NAK over R-ACKCH (Step 628) while retaining the data stored in the ARQ buffer (Step 624). The steps 614 to 624 in block 78 drawn by a dotted line represent an initial transmission-related decoding process performed by the mobile station.

However, if it is determined in step 610 that SP_ID is not set to '0' ("No" path to decision step 610), the mobile station compares AI_SN and EP_SIZE acquired by decoding the F-PDCCH with previously received AI_SN and EP_SIZE (Step 630). If both the AI_SN and EP_SIZE are not identical to the previously received AI_SN and EP_SIZE ("No" path from decision step 630), it means that a retransmitted subpacket is received before an initially received subpacket was received. In this case, an encoder packet is decoded using only the next subpacket without the initial subpacket. Therefore, the mobile station proceeds to step 612 to perform initial transmission instead of gating off the R-ACKCH.

As a result of the comparison in step 630, if the AI_SN and EP_SIZE are both identical to the previously received AI_SN and EP_SIZE ("Yes" path from decision step 630), the mobile station code/packet-combines a subpacket received over F-PDCH with previous subpackets previously received and stored in the ARQ buffer, and stores again the combined packet in the ARQ buffer (Step 632). Thereafter, the mobile station acquires an encoder packet by turbo-decoding the combined subpacket (Step 634). If no error is detected from the encoder packet, i.e., decoding is successfully performed ("Yes" path from decision step 636), the mobile station transmits ACK over R-ACKCH (Step 646).

However, if the decoding failed ("No" path from decision step 636), the mobile station increases the reception number Rx_Num by 1 (Step 638), and then compares the increased reception number Rx_Num with a predetermined maximum reception number MAX_RX_NUM (Step 640). If the reception number Rx_Num is larger than or equal to the maximum reception number MAX_RX_NUM ("Yes" path from decision step 640), the mobile station clears the ARQ buffer (Step 642), and transmits NAK over R-ACKCH (Step 648). If the reception number Rx_Num is smaller than the maximum reception number MAX_RX_NUM ("No" path from decision step 640), the mobile station transmits NAK over R-ACKCH (Step 648) while retaining the ARQ buffer (Step 644). The steps 632 to 644 in block 80 drawn by a dotted line represent a retransmission-related decoding process performed by the mobile station.

Since transmission of forward data traffic over F-PDCH is controlled through transmission of a retransmission-related response (ACK or NAK) achieved between a base station and a mobile station, the transmission of retransmission-related response must be performed with high reliability. However, transmission through F-PDCCH and R-ACKCH is achieved in a wireless channel environment, causing a transmission error. Although an error occurs in F-PDCCH or R-ACKCH, a mobile station should be able to handle packet data traffic and transmit a suitable response according thereto.

From this point of view, with reference to FIGS. 13A to 13D and FIGS. 14A to 14E, consideration will be taken regarding normal and abnormal situations, which may occur during transmission and reception of data packet and a response according to an H-ARQ protocol. Herein, a transmission packet will be represented by [A,0], where A means the contents of a corresponding encoder packet and '0' means AI_SN of the encoder packet. In addition, first (or initial) transmission subpackets will be represented by A,B,C; second subpackets (or first retransmission subpackets) by A',B', C'; and third subpackets (or second retransmission subpackets) by A",B",C".

FIGS. 13A to 13D are signal flow diagrams illustrating normal situations which may occur during transmission of data packet and a response according to an H-ARQ protocol.

Figure 13A:
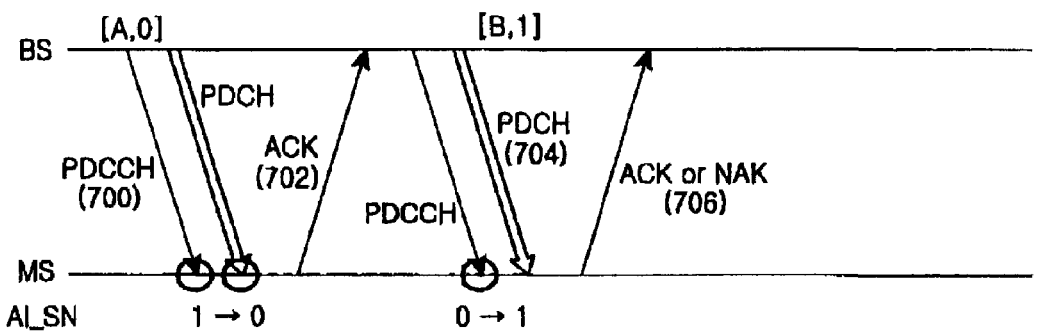
FIGS. 13A to 13D are signal flow diagrams for normal situations according to an H-ARQ protocol.

Referring to FIG. 13A, a base station (BS) transmits an initial transmission subpacket [A,0] of a transmission encoder packet and its associated control information over F-PDCH and F-PDCCH (Step 700). If a mobile station (MS) receives normally both the F-PDCH and the F-PDCCH, i.e., if no error is detected from data and information generated by decoding the F-PDCH and F-PDCCH, the mobile station generates an ACK indicating normal receipt of the encoder packet and transmits the ACK over R-ACKCH (Step 702). The base station then transmits a next encoder packet [B,1] and its associated control information over F-PDCH and F-PDCCH (Step 704). If at least the F-DCCH is received normally, the mobile station generates ACK or NAK according to the decoding result for the F-PDCH and transmits the ACK or NAK over R-ACKCH (Step 706).

Figure 13B:
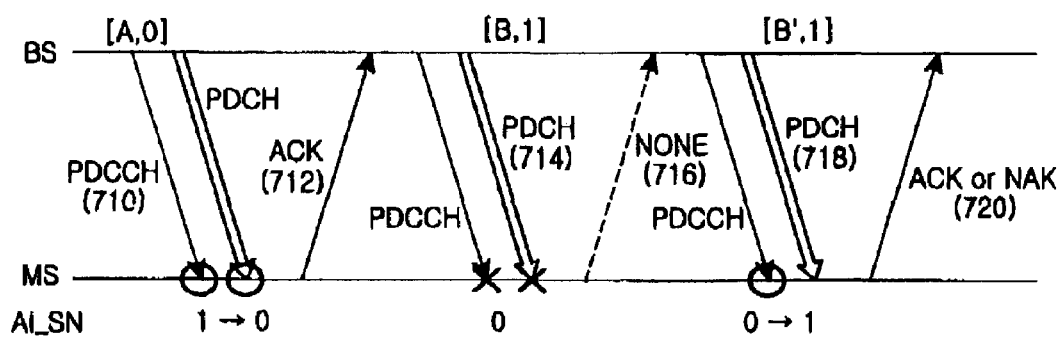

Referring to FIG. 13B, a base station (BS) transmits an initial transmission subpacket [A,0] of a transmission encoder packet and its associated control information over F-PDCH and F-PDCCH (Step 710). If a mobile station (MS) receives normally both the F-PDCH and the F-PDCCH, the mobile station generates ACK and transmits the ACK over R-ACKCH (Step 712). The base station then transmits a next encoder packet [B,1] and its associated control information over F-PDCH and F-PDCCH (Step 714). If both the F-PDCH and the F-PDCCH are not received normally due to variation in channel condition or movement of the mobile station, the mobile station can transmit no response (Step 716). Even though there is no response, the base station performs the operation as if a NAK was received. As a result, the base station transmits a retransmission subpacket [B',1] of the encoder packet B over F-PDCH, and at the same time, transmits its associated control information over F-PDCCH (Step 718). SP_ID included in the control information for the retransmission subpacket [B',1] is set to '1'. If the F-PDCCH transmitted in step 718 is received normally, the mobile station generates ACK or NAK according to the decoding result for F-PDCH and transmits the ACK or NAK over R-ACKCH (Step 720).

Figure 13C:
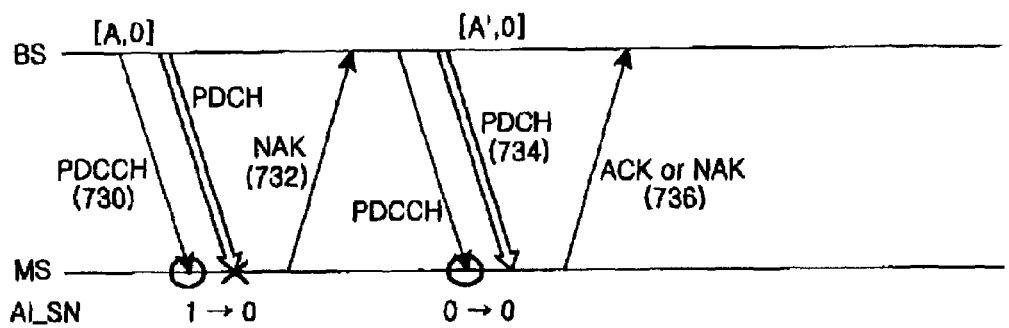

FIG. 13C is a signal flow diagram illustrating a situation where a mobile station waits for a retransmission packet after failure to decode F-PDCH. Referring to FIG. 13C, a base station transmits an initial transmission subpacket [A,0] of a transmission encoder packet and its associated control information over F-PDCH and F-PDCCH (Step 730). If F-PDCCH is received normally and an error is detected from data acquired by decoding F-PDCH using the control information, the mobile station generates an ACK message and transmits it over R-ACKCH (Step 732). The base station then transmits a retransmission subpacket [A',0] for the encoder packet and its associated control information over F-PDCH and F-PDCCH (Step 734). If at least the F-PDCCH is received normally, the mobile station generates an ACK or NAK message according to the decoding result for the F-PDCH, and transmits the ACK or NAK message over R-ACKCH (Step 736).

Figure 13D:
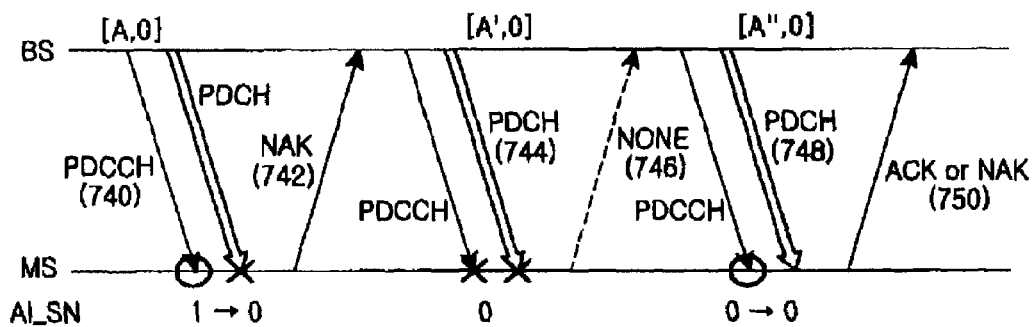

FIG. 13D is a signal flow diagram illustrates a situation where decoding of F-PDCH and F-PDCCH has failed. Referring to FIG. 13D, a base station transmits an initial transmission subpacket [A,0] of a transmission encoder packet and its associated control information over F-PDCH and F-PDCCH (Step 740). If the F-PDCCH is received normally and an error is detected from data acquired by decoding the F-PDCH using the control information, the mobile station generates a NAK message and transmits it over R-ACKCH (Step 742). The base station then transmits a retransmission subpacket [A',0] for the encoder packet and its associated control information over F-PDCH and F-PDCCH (Step 744). SP_ID included in control information for the retransmission subpacket [A',0] is set to '1'. If both the F-PDCH and the F-PDCCH are not received normally due to deterioration of channel conditions or movement of the mobile station, the mobile station transmits no response (Step 746). Even though there is no response, the base station performs the operation as if the NAK was received. As a result, the base station transmits a third subpacket (or second retransmission subpacket) [A",0] of the encoder packet A and its associated control information over F-PDCH and F-PDCCH (Step 748). SP_ID included in the control information for the third transmission subpacket [A",0] is set to '2'. If at least the F-PDCCH transmitted in step 748 is received normally, the mobile station generates an ACK or NAK message according to the decoding result for F-PDCH, and transmits the ACK or NAK over R-ACKCH (Step 720).

Next, abnormal situations will be described with reference to FIGS. 14A to 14E.

Figure 14A:
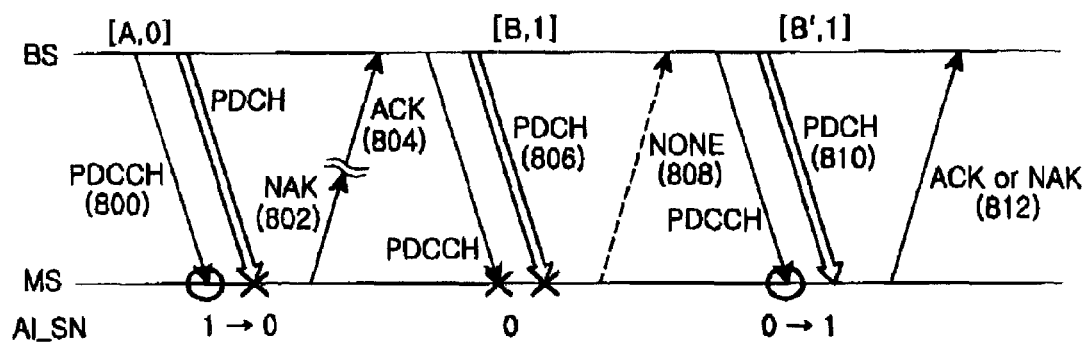
FIGS. 14A to 14E are signal flow diagrams for abnormal situations according to an H-ARQ protocol.

FIG. 14A is a signal flow diagram illustrating a situation where a mobile station fails to decode F-PDCH, incorrectly transmits a response thereto, and fails to receive an initial transmission subpacket. Referring to FIG. 14A, a base station (BS) transmits an initial transmission subpacket [A,0] of a transmission encoder packet and its associated control information over F-PDCH and F-PDCCH (Step 800). If the F-PDCCH is received normally and an error exists in an encoder packet acquired by decoding the F-PDCH, the mobile station (MS) transmits a NAK message over R-ACKCH (Step 802). At this point, although the mobile station transmitted the NAK, the base station may mistake the NAK for an ACK due to deterioration of the channel condition (Step 804). In this case, although the mobile station actually transmitted NAK, the base station determines that an ACK was received.

As a result, the base station transmits an initial transmission subpacket [B,1] of a new encoder packet B and its associated control information over F-PDCH and F-PDCCH (Step 806). At this point, AI_SN is changed from '0' to '1' in order to indicate transmission of a next encoder packet. The mobile station may fail to receive both the new initial transmission subpacket [B',1] and its associated control information and thus, may transmit no response (Step 808). The base station then transmits a retransmission subpacket [B',1] of the last transmitted subpacket [B,1] as if the NAK was received (Step 810). In this case, the mobile station handles separately the first encoder packet A and the second encoder packet B, and transmits an ACK or NAK in response thereto (Step 812). A detailed description of this will be discussed below.

Figure 14B:
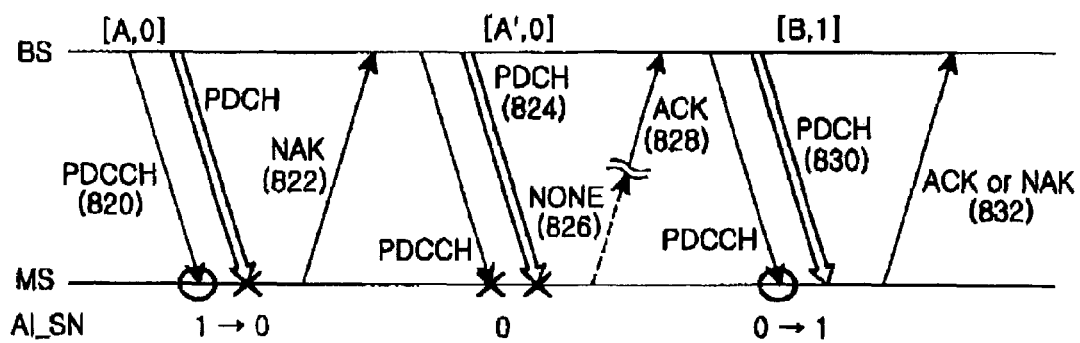

FIG. 14B is a signal flow diagram illustrating a situation where a mobile station fails to decode F-PDCH, fails to receive a retransmission subpacket, and incorrectly transmits a response thereto. Referring to FIG. 14B, the base station (BS) transmits an initial transmission subpacket [A,0] of a transmission encoder packet and its associated control information over F-PDCH and F-PDCCH (Step 820). If the F-PDCCH is received normally and an error exists in an encoder packet received over the F-PDCH, the mobile station (MS) transmits a NAK message over R-ACKCH (Step 822). In response to the NAK, the base station transmits a retransmission subpacket [A',0] of the encoder packet A to the mobile station (Step 824). If both the F-PDCH and the F-PDCCH transmitted in step 824 are not received normally, the mobile station transmits no response (Step 826). At this point, although the mobile station transmitted no response, the base station may detect an ACK due to deterioration of the channel condition (Step 828). As a result, the base station transmits an initial transmission subpacket [B,1] of the next encoder packet instead of transmitting a subpacket [A",0] that should have been transmitted (Step 830). The mobile station then handles separately the first encoder packet A and the second encoder packet B, and transmits an ACK or NAK in response thereto (Step 832). A detailed description of this will be discussed below.

Figure 14C:
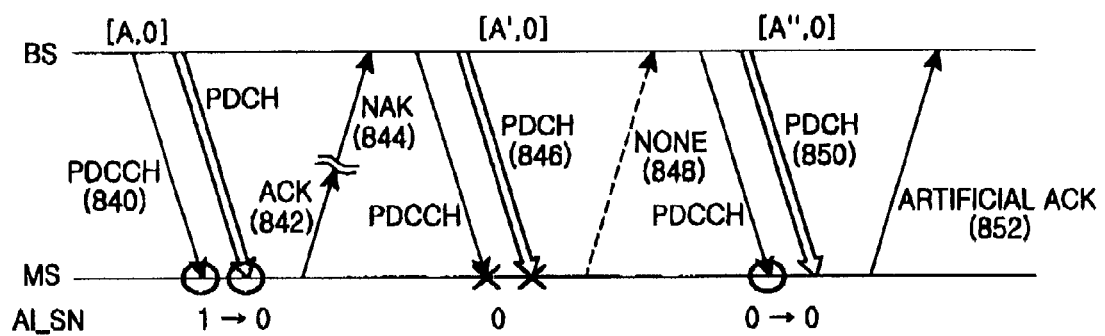

FIG. 14C is a signal flow diagram illustrating a situation where a mobile station succeeds in decoding F-PDCH and F-PDCCH, and incorrectly transmits an ACK message. Referring to FIG. 14C, a base station (BS) transmits an initial transmission subpacket [A,0] of a transmission encoder packet and its associated control information over F-PDCH and F-PDCCH (Step 840). If both the F-DPCH and the F-PDCCH are received normally, the mobile station (MS) generates an ACK message and transmits it over R-ACKCH (Step 842). At this point, although the mobile station transmitted the ACK, the base station may detect a NAK due to deterioration of the channel condition (Step 844). As a result, the base station transmits a retransmission subpacket [A',0] of the encoder packet and its associated control information over F-PDCH and F-PDCCH (Step 846). If both the F-PDCH and the F-PDCCH transmitted in step 846 are not received normally, the mobile station transmits no response (Step 848). If the mobile station transmits no response, the base station performs the operation as if a NAK was received. As a result, the base station transmits a third subpacket [A",0] of the encoder packet (Step 850). Even when retransmission is performed on the previously successfully received encoder packet, the mobile station separately generates an artificial ACK and transmits the artificial ACK to the base station (Step 852). A detailed description of this will be discussed below.

Figure 14D:
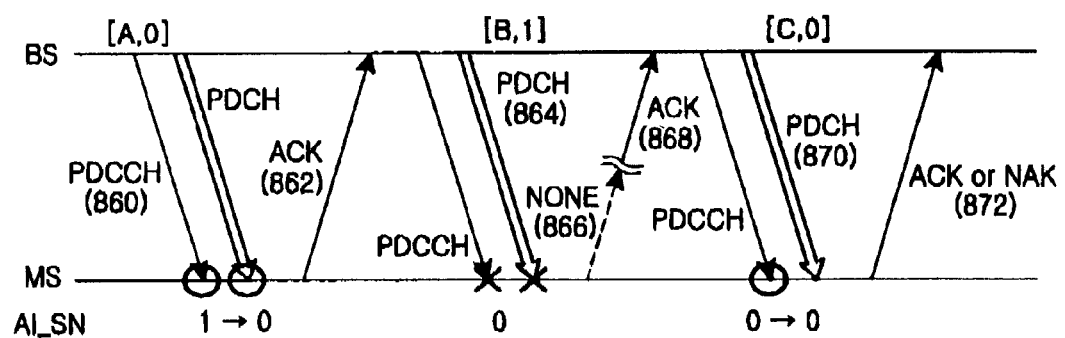

FIG. 14D is a signal flow diagram illustrating a situation where a mobile station receives an initial transmission subpacket of a new encoder packet before F-PDCH and F-PDCCH are received. Referring to FIG. 14D, a base station (BS) transmits an initial transmission subpacket [A,0] of a transmission encoder packet and its associated control information over F-PDCH and F-PDCCH (Step 860). If both the F-DPCH and the F-PDCCH are received normally, the mobile station (MS) generates an ACK message and transmits it over R-ACKCH (Step 862). The base station then transmits an initial transmission subpacket [B,1] of the next encoder packet and its associated control information over F-PDCH and F-PDCCH (Step 864). If both the F-PDCH and the F-PDCCH are not received normally, the mobile station transmits no response (Step 866). Although the mobile station transmitted no response, the base station may detect an ACK message due to variations in the channel condition, movement of the mobile station, or an interference signal from another mobile station (Step 868). In this case, the base station transmits an initial transmission subpacket [C,0] of the next encoder packet (Step 870). The mobile station then handles separately the first to third encoder packets A, B and C, and transmits ACK or NAK as a response thereto (Step 872). A detailed description of this will be discussed below.

Figure 14E:
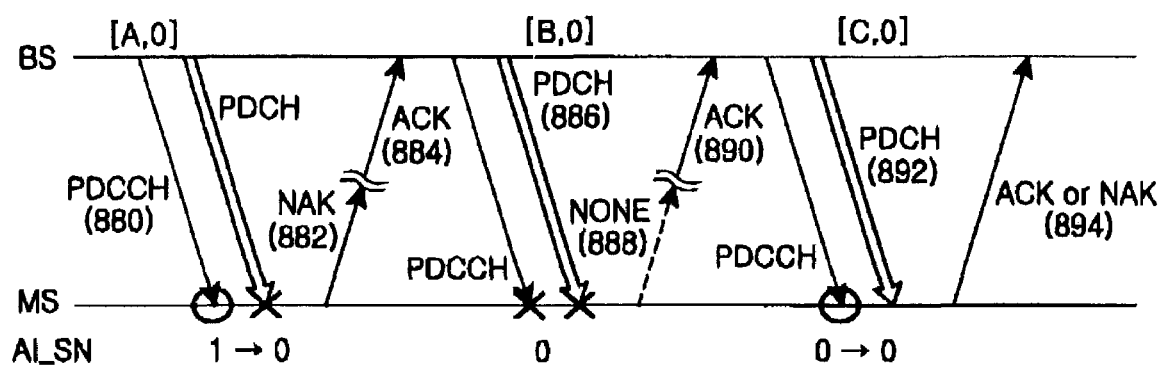

FIG. 14E is a signal flow diagram illustrating a situation, where, although a mobile station transmitted a NAK message indicating failure to decode F-PDCH, a base station transmits a new encoder packet by mistaking the NAK for an ACK indicating success in decoding F-PDCH, and although the mobile station failed to receive the new encoder packet, the base station transmits another new encoder packet. Referring to FIG. 14E, the base station (BS) transmits an initial transmission subpacket [A,0] of a transmission encoder packet and its associated control information over F-PDCH and F-PDCCH (Step 880). If the F-DPCCH is received normally and there exists an error in an encoder packet received over the F-PDCH, the mobile station (MS) transmits a NAK over R-ACKCH (Step 882). At this point, although the mobile station transmitted the NAK, the base station may detect an ACK due to deterioration of the channel condition (Step 884). As a result, the base station transmits an initial transmission subpacket [B,1] of the next encoder packet and its associated control information over F-PDCH and F-PDCCH (Step 886). If both the F-PDCH and the F-PDCCH transmitted in step 886 are not received normally, the mobile station transmits no response (Step 888). However, although the mobile station transmitted no response, the base station may detect an ACK message due to variations in the channel condition or an interference signal from another mobile station (Step 890). In this case, the base station transmits an initial transmission subpacket [C,0] of another next encoder packet (Step 892). The mobile station then receives another new encoder packet C before it succeeds in decoding the first encoder packet A and receives the second encoder packet B. The mobile station handles separately the encoder packets A, B and C, and transmits an ACK or NAK in response thereto (Step 894). A detailed description of this will be discussed below.

A description will now be made of the normal situations.

In the case where an operation is performed normally as described in conjunction with FIGS. 13A to 13D, each time a subpacket and its associated control information are received, the mobile station compares a previously received AI_SN with a currently received AI_SN, and determines whether the currently received subpacket is a new subpacket (i.e., initial transmission subpacket) or a continue subpacket (i.e., retransmission subpacket), as follows:

(1) if the current AI_SN is not identical to the previous AI_SN, the mobile station determines that a received subpacket is an initial transmission subpacket;

(2) if the current AI_SN is identical to the previous AI_SN, the mobile station determines that a received subpacket is a retransmission subpacket.

In the case where no error exists in R-ACKCH, when the mobile station transmits ACK over R-ACKCH and then expects to receive an initial transmission subpacket, the base station actually transmits an initial transmission subpacket. Likewise, when the mobile station transmits a NAK over R-ACKCH and then expects to receive a retransmission subpacket, the base station actually transmits a retransmission subpacket. Therefore, upon receiving a retransmission subpacket, the mobile station performs a retransmission-related decoding process on the received subpacket. The retransmission-related decoding process, as mentioned above, includes code/packet-combining and decoding.

In the case where an error has occurred in R-ACKCH, as described in conjunction with FIGS. 14A to 14E, the mobile station compares a currently received AI_SN with a previously received AI_SN, and determines whether a currently received subpacket is a new subpacket (i.e., initial transmission subpacket) or a continue subpacket (i.e., retransmission subpacket), as follows:

(1) If the current AI_SN is not identical to the previous AI_SN, the mobile station determines that a received subpacket is an initial transmission subpacket;

(2) If the current AI_SN is identical to the previous AI_SN, the mobile station determines whether a received subpacket is an initial transmission subpacket or a retransmission subpacket by applying additional criteria for more accurate determination.

In abnormal situations, particularly, when the current AI_SN is identical to a previous AI_SN, the mobile station cannot determine whether a received subpacket is a retransmission subpacket by simply comparing the AI_SNs for the following reasons.

If the base station incorrectly analyzes or fails to receive the ACK/NAK transmitted over R-ACKCH by a mobile station due to an error occurring in the R-ACKCH, the base station transmits another subpacket rather than a subpacket that the mobile station expects to receive. In this case, when the mobile station expects an initial transmission subpacket, the base station transmits a retransmission subpacket. Alternatively, when the mobile station expects a retransmission subpacket, the base station transmits an initial transmission subpacket. This corresponds to the situations of FIGS. 14A and 14B, wherein the ACK and NAK message were mistaken for NAK and ACK messages respectively.

In the situations of FIGS. 14A and 14B, a currently received subpacket is regarded as an initial transmission subpacket by the mobile station, and undergoes an initial transmission-related decoding process. The initial transmission-related decoding process, as mentioned above, includes resetting of an ARQ buffer and storing and decoding of a currently received subpacket.

Even in the case where an error has occurred in R-ACKCH, if the received AI_SN is not identical to the previous AI_SN, the mobile station regards a currently received subpacket as an initial transmission subpacket. This is because it is possible to restore an encoder packet with only a retransmission subpacket without an initial transmission subpacket.

With reference to FIGS. 14C to 14E, a description will now be provided regarding the situations wherein the current AI_SN is identical to a previous AI_SN.

In the situation illustrated in FIG. 14C, a currently received subpacket was generated from an encoder packet A, and an ACK message was transmitted after decoding the encoder packet A successfully. Therefore, the mobile station transmits an artificial ACK over R-ACKCH without decoding the currently received subpacket.

In the situation illustrated in FIG. 14D, although an ACK/NAK message was not transmitted over R-ACKCH, the base station detects an ACK message. A subpacket currently received by the mobile station was generated from a new encoder packet C. In this case, the mobile station regards the currently received subpacket as an initial transmission subpacket in performing an initial transmission-related decoding process. In this case, the subpacket [B,1] of a second encoder packet B is disregarded, since retransmission request for the subpacket [B,1] will be performed by an upper layer.

Finally, in the situation illustrated in FIG. 14E, when a mobile station waits for a retransmission subpacket after transmitting a NAK message over R-ACKCH, a subpacket is received whose current AI_SN and previous AI_SN are identical to each other. This corresponds to the case in which after the decoding of F-PDCCH failed NAK was mistakenly transmitted over R-ACKCH as ACK. The currently received subpacket was generated from a new encoder packet C. Therefore, the mobile station determines that the currently received subpacket is an initial transmission subpacket, and performs an initial transmission-related decoding process. Likewise, a subpacket [A,0] of a first subpacket A and a subpacket [B,1] of a second encoder packet B are disregarded, since retransmission request for the subpackets [A,0] and [B,1] will be performed by an upper layer.

In summary, if AI_SN is not changed in a state where an error has occurred in R-ACKCH, the mobile station operates as follows. In particular, when the mobile station was waiting for an initial transmission subpacket, the mobile station must conduct different operations according to the type of error which occurred in the R-ACKCH. The following three (3) examples illustrate the aforementioned types of errors.

(1) If a current AI_SN is identical to a previous AI_SN while the mobile station waits for an initial transmission subpacket, the mobile station transmits an artificial ACK over R-ACKCH since the received subpacket is a retransmission subpacket.

(2) If a current AI_SN is not identical to a previous AI_SN while the mobile station waits for an initial transmission subpacket, the mobile station performs an initial transmission-related decoding process since the received subpacket is an initial transmission subpacket.

(3) If a current AI_SN is identical to a previous AI_SN while the mobile station waits for a retransmission subpacket, the mobile station performs an initial transmission-related decoding process since the received subpacket is an initial transmission subpacket.

A mobile station determines whether to retransmit a subpacket by applying an H-ARQ protocol in the following two methods: First, if the current AI_SN is not identical to a previous AI_SN, the mobile station determines that the received subpacket is an initial transmission subpacket regardless of whether an error has occurred in R-ACKCH. Second, in the case where the current AI_SN is identical to a previous AI_SN, the mobile station determines that the received subpacket is a retransmission subpacket if no error exists in R-ACKCH. However, if an error exists in R-ACKCH, the mobile station determines that the received subpacket is an initial transmission subpacket or a retransmission subpacket, according to the type of the error.

However, the mobile station cannot correctly determine whether an error has occurred in R-ACKCH, and the type of the error, if it occurred. Therefore, the mobile station minimizes retransmission-related mis-operation by predicting whether an error has occurred in R-ACKCH, depending upon SP_ID and EP_SIZE, as follows:

(A) If the current AI_SN is not identical to the previous AI_SN, the mobile station determines that the received subpacket is an initial transmission subpacket;

(B) If the current AI_SN is identical to the previous AI_SN, the mobile station compares the currently received EP_SIZE with the previously received EP_SIZE;

(B-1) If the current EP_SIZE is not identical to the previous EP_SIZE, the mobile station determines that the received subpacket is an initial transmission subpacket; and (B-2) If the current EP_SIZE is identical to the previous EP_SIZE, the mobile station determines whether a response previously transmitted over R-ACKCH is an ACK or NAK. If an ACK was previously transmitted, it means that the mobile station was waiting for an initial transmission subpacket. If a NAK was previously transmitted, it means that the mobile station was waiting for a retransmission subpacket. If the current AI_SN is identical to the previous AI_SN while the mobile station is waiting an initial transmission subpacket, it implies an abnormal situation in which an error has occurred in R-ACKCH. If the current AI_SN is identical to the previous AI_SN while the mobile station is waiting for a retransmission subpacket, it implies a normal situation in which no error has occurred in R-ACKCH.

Meanwhile, in the abnormal situation in which the current AI_SN is identical to the previous AI_SN when a mobile station is waiting for a retransmission subpacket, the mobile station should determine that a received subpacket is an initial transmission subpacket and perform the corresponding process. Actually, however, the mobile station determines that the currently received subpacket is a retransmission subpacket, considering the current situation as a normal situation in which no error has occurred in R-ACKCH.

However, in FIG. 4E, if the size EP_SIZE of an encoder packet C is larger than the size (previous EP_SIZE) of an encoder packet A, the mobile station determines that the currently received subpacket is an initial transmission subpacket previously received by (B-1). In addition, since there is very low probability that the event of FIG. 4E will happen, there is almost no initial transmission subpacket that cannot be detected even through comparison between the current EP_SIZE and the previous EP_SIZE. Therefore, in this case, the following two determinations are available:

(a) If a previous response is a NAK, the mobile station determines that the received subpacket is a retransmission subpacket.

(b) If a previous response is an ACK, the mobile station determines whether the received SP_ID is set to 0 or not.

Although the mobile station recognizes an abnormal situation when the current AI_SN is identical to the previous AI_SN and a previous response is ACK, the mobile station cannot determine what type of an error has occurred in R-ACKCH. Therefore, the mobile station cannot determine whether a received subpacket is a retransmission subpacket, for which an artificial ACK is required, or an initial transmission subpacket. An initial transmission subpacket, which cannot be determined even through comparison of EP_SIZE, can be detected by SP_ID. However, in some cases, there exists a retransmission subpacket with SP_ID=0. Therefore, if subpackets with SP_ID=0 are all determined as initial transmission subpackets, then a retransmission subpacket, for which an ACK is required, may be occasionally incorrectly determined as an initial transmission subpacket.

If SP_ID≠0, it is preferable that the mobile station transmits an artificial ACK over R-ACKCH without decoding the received subpacket. However, as mentioned above, the mobile station can succeed in decoding an encoder packet through a retransmission-related decoding process with only a retransmission subpacket without a general initial transmission subpacket. Therefore, the present invention does not separately distinguish a retransmission subpacket for which artificial ACK is required, from a general subpacket.

Figure 15:
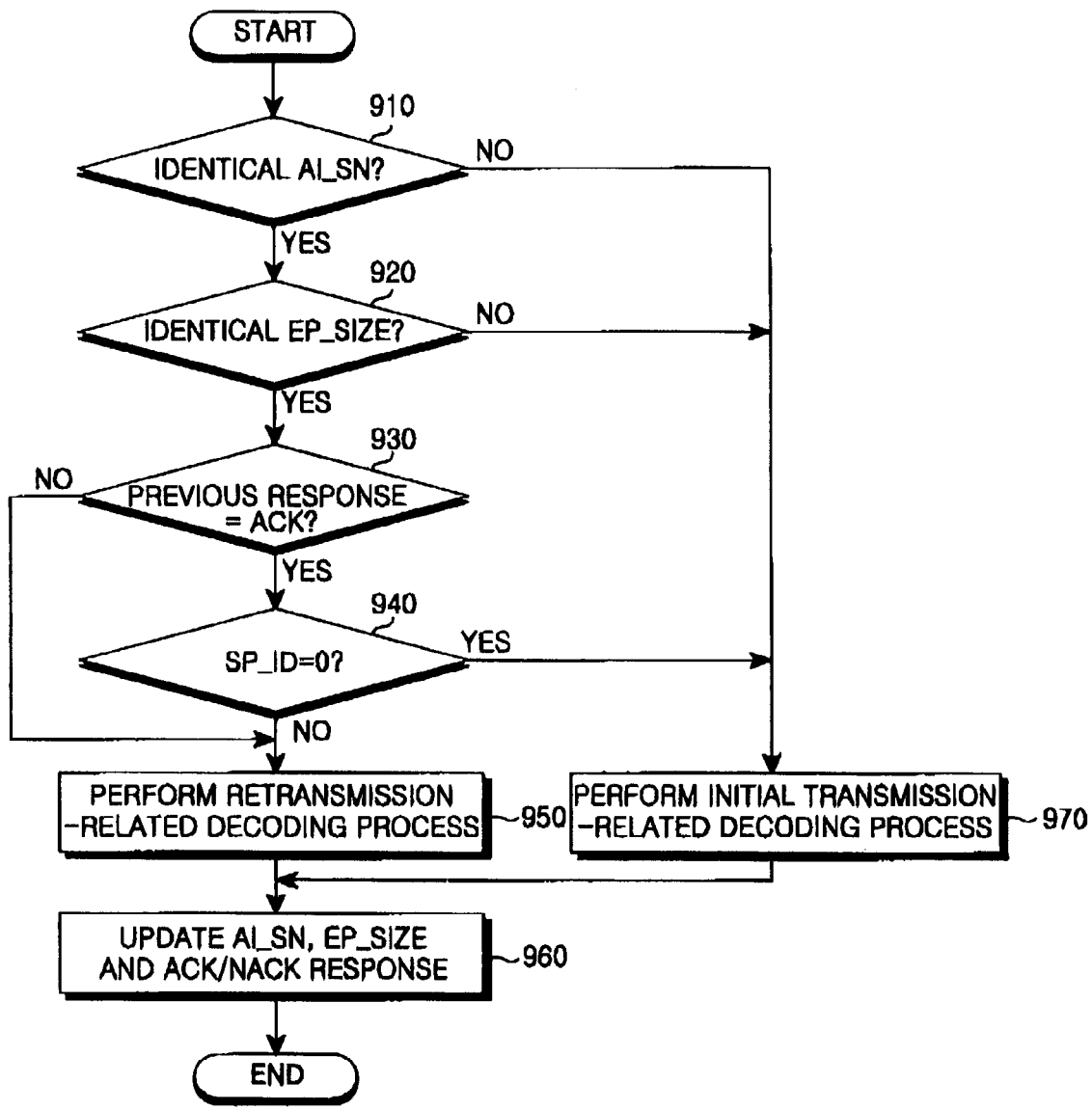
FIG. 15 is a flowchart illustrating an H-ARQ operation by a mobile station according to an additional embodiment of the present invention.

FIG. 15 is a flowchart illustrating an H-ARQ operation by a mobile station according to an embodiment of the present invention. The procedure described below is performed after the decoding of F-PDCCH and comparison of MAC_ID have been accomplished, described in conjunction with FIGS. 8, 10 and 12.

Referring to FIG. 15, a mobile station compares a currently received AI_SN with a previously stored AI_SN, thereby determining whether an encoder packet is received whose AI_SN is identical to the previous AI_SN (Step 910). If an encoder packet is received which has an AI_SN which is not identical to the previous AI_SN ("No" path from decision step 910), the mobile station performs an initial transmission-related decoding process (Step 970). In step 970 the mobile station clears an ARQ buffer, acquires an encoder packet by decoding an initial subpacket received over F-PDCH, and determines whether an error is detected from the encoder packet. If no error is detected, the mobile station transmits an ACK. If an error is detected, the mobile station transmits a NAK. When a NAK is transmitted, the initial subpacket is stored in the ARQ buffer. As a result of the determination in step 910, if the current AI_SN is identical to the previous AI_SN ("Yes" path from decision step 910), the mobile station determines whether a currently received EP_SIZE is identical to a previously received EP_SIZE (Step 920). If the two EP_SIZEs are not identical to each other ("No" path from decision step 920), the mobile station performs the initial transmission-related decoding process, determining that a new encoder packet was received (Step 970).

However, if the two EP_SIZEs are identical to each other ("Yes" path from decision step 920), the mobile station determines whether a response previously transmitted over R-ACKCH is an ACK (Step 930). If a previously transmitted response is NAK ("No" path from decision step 930), the mobile station performs a retransmission-related decoding process (Step 950). In step 950 the mobile station combines a subpacket received over F-PDCH with subpackets previously stored in the ARQ buffer, acquires an encoder packet by decoding the combined subpacket, and determines whether an error is detected from the encoder packet. If no error is detected, the mobile station transmits an ACK. However, if an error is detected, the mobile station transmits a NAK. When a NAK is transmitted, the combined subpacket is stored in the ARQ buffer. However, if a reception number for the same encoder packet has arrived at a previously determined maximum reception number, the mobile station abandons reception of the encoder packet and clears the ARQ buffer.

If it is determined in step 930 that a previously transmitted response is an ACK ("Yes" path from decision step 930), the mobile station determines whether a currently received SP_ID is set to 0 (Step 940). If the SP_ID is set to 0 ("Yes" path from decision step 940), the mobile station performs the initial transmission-related decoding process (Step 970). Otherwise, the mobile station performs the retransmission-related decoding process ("No" path from decision step 950).

After performing the initial transmission-related decoding process (Step 970) and the retransmission-related decoding process (Step 950), the mobile station stores currently received control information AI_SN, EP_SIZE and ACK/NAK response (Step 960).

The present invention has been described to include at least the following advantages:

In a 1×EV-DV high-speed wireless packet data communication system, the present invention efficiently performs H-ARQ, contributing to prevention of ambiguity which may occur during system realization, and improvement of system throughput. In addition, the present invention promptly properly handles received subpackets regardless of whether an error has occurred in R-ACKCH, enabling a packet data service at higher speed.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An automatic repeat request, ARQ, method for generating an encoder packet by receiving control information including a subpacket identifier, SP_ID, representing the sequence of a subpacket, a size of an encoder packet EP_SIZE, and a sequence identifier, AI_SN, that is toggled each time a new encoder packet is transmitted, while receiving one of a plurality of subpackets generated by segmenting a bit steam acquired by encoding a transmission encoder packet, in a wireless packet data communication system, the method comprising:

generating the encoder packet by performing a decoding process caused by initial transmission on the received subpacket, if the AI_SN and the EP_SIZE are both not identical to previously received AI_SN and EP_SIZE;

generating the encoder packet by performing the decoding process caused by retransmission on the received subpacket, if the AI_SN and the EP_SIZE are both identical to previously received AI_SN and EP_SIZE and ACK is not transmitted in response to a previously received subpacket.

2. The method of claim 1, further comprising: determining whether the SP_ID is set to a value representing initial transmission, if the AI_SN and the EP_SIZE are both identical to previously received AI_SN and EP_SIZE and an acknowledge signal, ACK, is transmitted in response to a previously received subpacket; and generating the encoder packet by performing the decoding process caused by retransmission on the received subpacket, if the SP_ID is not set to the value representing initial transmission.

3. The method of claim 2, further comprising:

generating the encoder packet by performing the decoding process caused by initial transmission on the received subpacket, if the SP_ID is set to the value representing initial transmission.

4. The method of claim 1, wherein the step of performing the decoding process caused by initial transmission comprises:

setting a reception number for the encoder packet to '0', and clearing a buffer;

storing the received subpacket in the buffer, and generating the encoder packet by decoding the stored subpacket; and increasing the reception number by 1 if no error has occurred in the encoder packet.

5. The method of claim 4, wherein the step of performing the decoding process caused by retransmission comprises:

combining the received subpacket with a subpacket previously stored in the buffer, and storing again the combined subpacket in the buffer;

generating the encoder packet by decoding the combined stored subpacket;

increasing the reception number by 1 if no error has occurred in the encoder packet, and then determining whether the reception number has arrived at a predetermined maximum reception number; and clearing the buffer if the reception number has arrived at the maximum reception number.

6. The method of claim 1, further comprising:

determining whether an error has occurred in the encoder packet;

transmitting ACK if no error has occurred; and transmitting a negative acknowledge signal, NAK, if an error has occurred.

7. An automatic repeat request, ARQ, method for generating an encoder packet by receiving control information including a subpacket identifier, SP_ID, representing the sequence of a subpacket, a size of an encoder packet EP_SIZE, and a sequence identifier, AI_SN, that is toggled each time a new encoder packet is transmitted, while receiving one of a plurality of subpackets generated by segmenting a bit stream acquired by encoding a encoder packet, in a wireless packet data communication system, the method comprising:

determining whether the SP_ID is set to a value representing initial transmission;

generating the encoder packet by performing a decoding process caused by initial transmission on the received subpacket, if the SP_ID is set to the value representing initial transmission and the AI_SN and the EP_SIZE are both not identical to previously received AI_SN and EP_SIZE; and generating the encoder packet by performing a decoding process caused by retransmission on the received subpacket, if the SP_ID is not set to the value representing initial transmission and the AI_SN and the EP_SIZE are both identical to previously received AI_SN and EP_SIZE.

8. The method of claim 7, wherein the step of performing the decoding process caused by initial transmission comprises:

setting a reception number for the encoder packet to '0', and clearing a buffer;

storing the received subpacket in the buffer, and generating the encoder packet by decoding the stored subpacket; and increasing the reception number by 1 if no error has occurred in the encoder packet.

9. The method of claim 8, wherein the step of performing the decoding process caused by retransmission comprises:

combining the received subpacket with a subpacket previously stored in the buffer, and storing again the combined subpacket in the buffer;

generating the encoder packet by decoding the combined stored subpacket;

increasing the reception number by 1 if no error has occurred in the encoder packet, and then determining whether the reception number has arrived at a predetermined maximum reception number; and clearing the buffer if the reception number has arrived at the maximum reception number.

10. The method of claim 7, further comprising the steps of:

determining whether an error has occurred in the encoder packet;

transmitting ACK if no error has occurred; and transmitting a negative acknowledge signal, NAK, if an error has occurred.

11. An apparatus for receiving an encoder packet in a wireless packet data communication system, comprising:
   a data channel receiver for receiving, over a data channel, one of a plurality of subpackets generated by segmenting a bit stream acquired by encoding a transmission encoder packet, and generating an encoder packet by performing a decoding process caused by initial transmission or a decoding process caused by retransmission on the received subpacket;
   a control channel receiver for receiving control information including a subpacket identifier, SP_ID, representing the sequence of the subpacket, a size of the encoder packet, EP_SIZE, and a sequence identifier, AI_SN, that is toggled each time a new encoder packet is transmitted;
   an acknowledge channel, ACKCH, transmitter for transmitting an acknowledge signal, ACK, if no error has occurred in the encoder packet, and transmitting a negative acknowledge signal, NAK, if an error has occurred in the encoder packet; and
   a hybrid automatic repeat request, H-ARQ, controller for determining whether it will perform the decoding process caused by initial transmission or the decoding process caused by retransmission on the received subpacket, based on the control information, such that the H-ARQ controller performs the following operations:
      determining to perform the decoding process caused by initial transmission on the received subpacket, if the AI_SN and the EP_SIZE are both not identical to previously received AI_SN and EP_SIZE; and
      determining to perform the decoding process caused by retransmission on the received subpacket, if the AI_SN and the EP_SIZE are both identical to previously received AI_SN and EP_SIZE and ACK is not transmitted in response to a previously received subpacket.

12. The apparatus of claim 11, wherein the H-ARQ controller determines whether the SP_ID is set to a value representing initial transmission, if the AI_SN and the EP_SIZE are both identical to previously received AI_SN and EP_SIZE and ACK is transmitted in response to a previously received subpacket, and determines to perform the decoding process caused by retransmission on the received subpacket, if the SP_ID is not set to the value representing initial transmission.

13. The apparatus of claim 12, wherein the H-ARQ controller determines to perform the decoding process caused by initial transmission on the received subpacket, if the SP_ID is set to the value representing initial transmission.

14. The apparatus of claim 11, wherein if the H-ARQ controller determines to perform the decoding process caused by initial transmission, the data channel receiver comprises:
   setting a reception number for the encoder packet to '0', and clearing a buffer;
   storing the received subpacket in the buffer, and generating the encoder packet by decoding the stored subpacket; and
   increasing the reception number by 1 if no error has occurred in the encoder packet.

15. The apparatus of claim 14, wherein if the H-ARQ controller determines to perform the decoding process caused by retransmission, the data channel receiver comprises:
   combining the received subpacket with a subpacket previously stored in the buffer, and storing again the combined subpacket in the buffer;
   generating the encoder packet by decoding the combined stored subpacket;
   if no error has occurred in the encoder packet, increasing the reception number by 1 and then determining whether the reception number has arrived at a predetermined maximum reception number; and
   clearing the buffer if the reception number has arrived at the maximum reception number.

16. An apparatus receiving an encoder packet in a wireless packet data communication system, comprising:
   a data channel receiver for receiving, over a data channel, one of a plurality of subpackets generated by segmenting a bit stream acquired by encoding a transmission encoder packet, and generating an encoder packet by performing a decoding process caused by initial transmission or a decoding process caused by retransmission on the received subpacket;
   a control channel receiver for receiving control information including a subpacket identifier, SP_ID, representing the sequence of the subpacket, a size of the encoder packet, EP_SIZE, and a sequence identifier, AI_SN, that is toggled each time a new encoder packet is transmitted;
   an acknowledge channel, ACKCH, transmitter for transmitting an acknowledge signal, ACK, if no error has occurred in the encoder packet, and transmitting a negative acknowledge signal, NAK, if an error has occurred in the encoder packet; and
   a hybrid automatic repeat request, H-ARQ, controller for determining whether it will perform the decoding process caused by initial transmission or the decoding process caused by retransmission on the received subpacket, based on the control information, the H-ARQ controller performing the following operations:
      determining whether the SP_ID is set to a value representing initial transmission;
      determining to perform the decoding process caused by initial transmission on the received subpacket if the SP_ID is set to the value representing initial transmission and the AI_SN and the EP_SIZE are both not identical to previously received AI_SN and EP_SIZE; and
      determining to perform the decoding process caused by retransmission on the received subpacket if the SP_ID is not set to a value representing initial transmission and the AI_SN and the EP_SIZE are both identical to previously received AI_SN and EP_SIZE.

17. The apparatus of claim 16, wherein if the H-ARQ controller determines to perform the decoding process caused by initial transmission, the data channel receiver comprises:
   setting a reception number for the encoder packet to '0', and clearing a buffer;
   storing the received subpacket in the buffer, and generating the encoder packet by decoding the stored subpacket; and
   increasing the reception number by 1 if no error has occurred in the encoder packet.

18. The apparatus of claim 17, wherein if the H-ARQ controller determines to perform the decoding process caused by retransmission, the data channel receiver comprises:
   combining the received subpacket with a subpacket previously stored in the buffer, and storing again the combined subpacket in the buffer;
   generating the encoder packet by decoding the combined stored subpacket;
   if no error has occurred in the encoder packet, increasing the reception number by 1 and then determining whether the reception number has arrived at a predetermined maximum reception number; and
   clearing the buffer if the reception number has arrived at the maximum reception number.

* * * * *